(12) United States Patent
Yamada et al.

(10) Patent No.: US 6,459,664 B1
(45) Date of Patent: Oct. 1, 2002

(54) OPTICAL DISC TILT CONTROL APPARATUS

(75) Inventors: Shin-ichi Yamada, Osaka (JP); Masayoshi Abe, Osaka (JP); Hiroyuki Yamaguchi, Hyogo (JP); Kouichi Takamine, Hyogo (JP); Seiji Nishiwaki, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/386,458

(22) Filed: Aug. 31, 1999

(30) Foreign Application Priority Data

Aug. 31, 1998 (JP) .......................................... 10-244879
Oct. 14, 1998 (JP) .......................................... 10-291689

(51) Int. Cl.[7] ............................................. G11B 7/00
(52) U.S. Cl. ............................... 369/44.32; 369/44.28; 369/44.35; 369/53.19
(58) Field of Search ................... 369/44.27, 44.28, 369/44.29, 44.32, 44.34, 44.35, 44.41, 47.1, 53.1, 53.12, 53.13, 53.14, 53.19, 53.23

(56) References Cited

U.S. PATENT DOCUMENTS 5,268,887 A * 12/1993 Honguh et al. .......... 369/275.3
5,532,990 A * 7/1996 Koyama et al. .......... 369/44.29
5,930,211 A * 7/1999 Sasaki ..................... 369/44.29

FOREIGN PATENT DOCUMENTS

| JP | 59-191143 | 10/1984 |
| JP | 2-287924 | 11/1990 |
| JP | 7-302428 | 11/1995 |
| JP | 10-83537 | 3/1998 |

* cited by examiner

Primary Examiner—Muhammad Edun
(74) Attorney, Agent, or Firm—Wenderoth, Lind & Ponack, L.L.P.

(57) ABSTRACT

An optical disc apparatus corrects the tilting of the optical disc with a high accuracy using first and second tracking error signals. A first tracking error signal, which is an output of subtractor (125), obtained by the push-pull method is corrected by detecting a second tracking error signal. The second tracking error signal is obtained by using the difference of amplitude of first and second signals, which are outputs of adder (130). The first signal is obtained when the light beam passes over a first pit sequence formed in a position offset in one direction orthogonal to the track of disc (100). The second signal is obtained when the light beam passes over a second pit sequence formed in a position offset in the other direction orthogonal to the track.

29 Claims, 37 Drawing Sheets

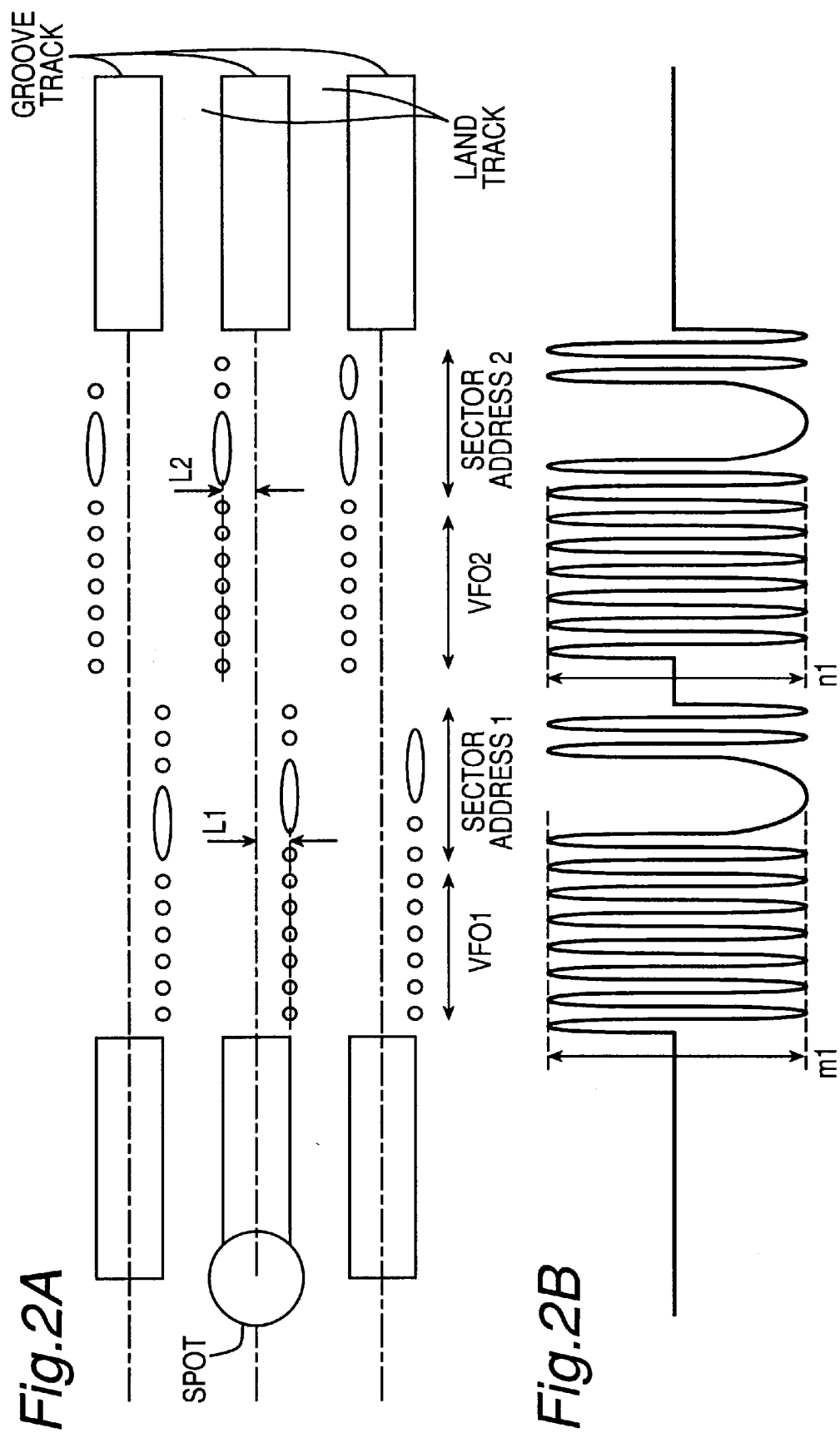

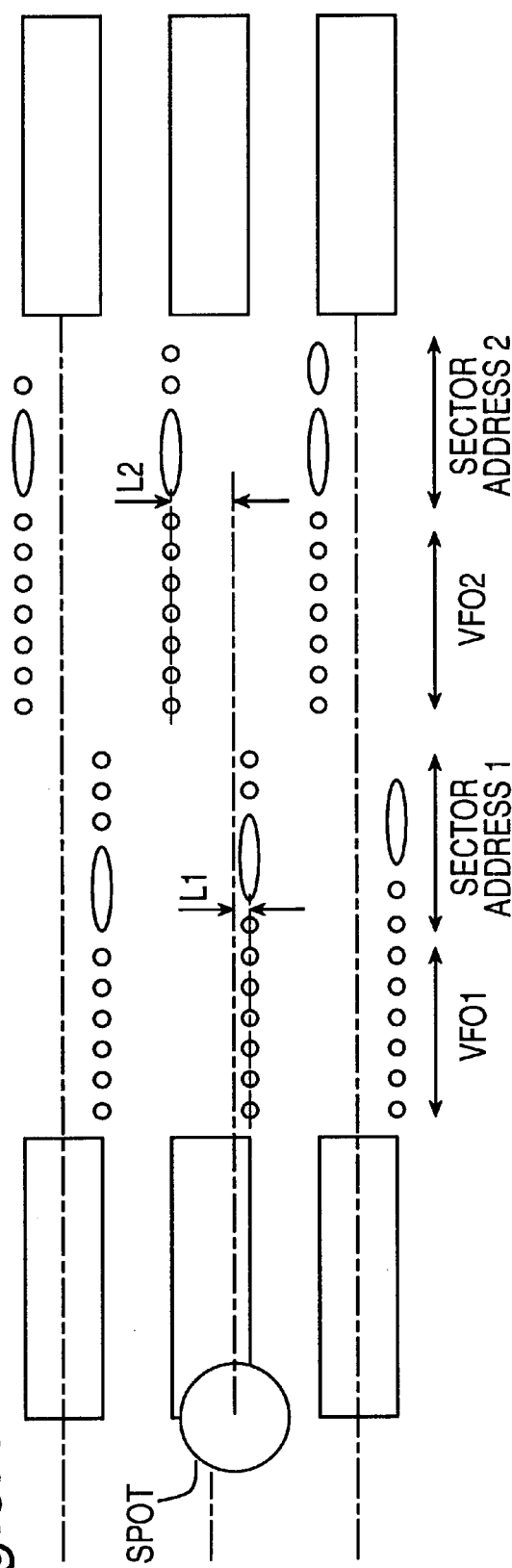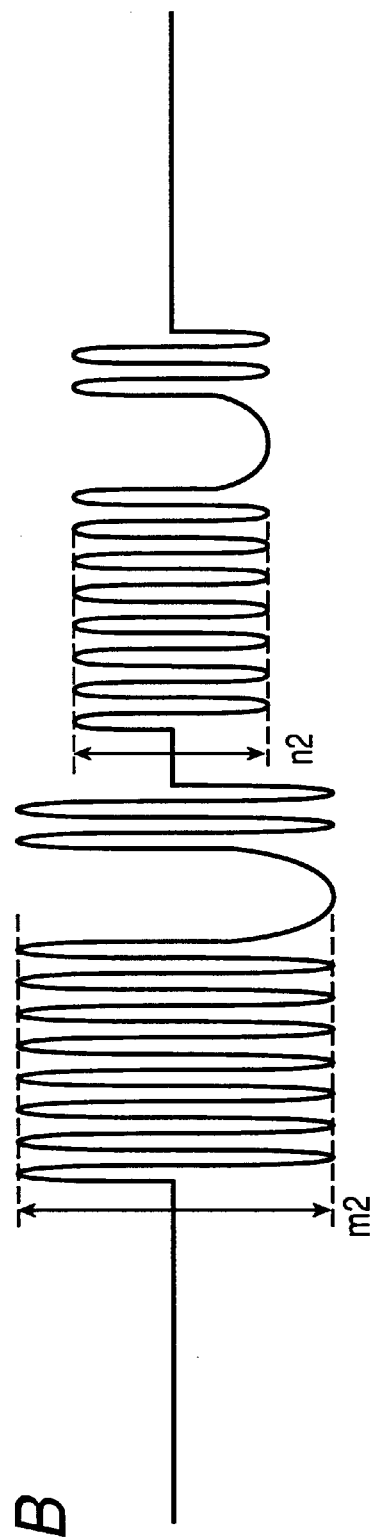

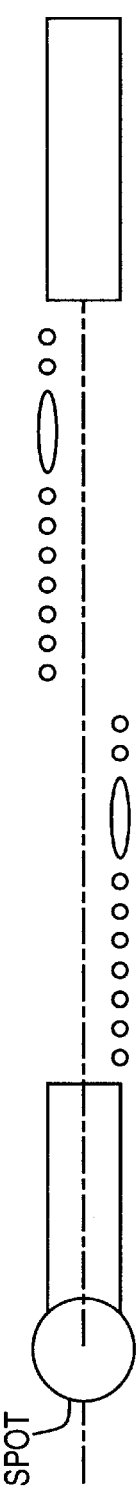
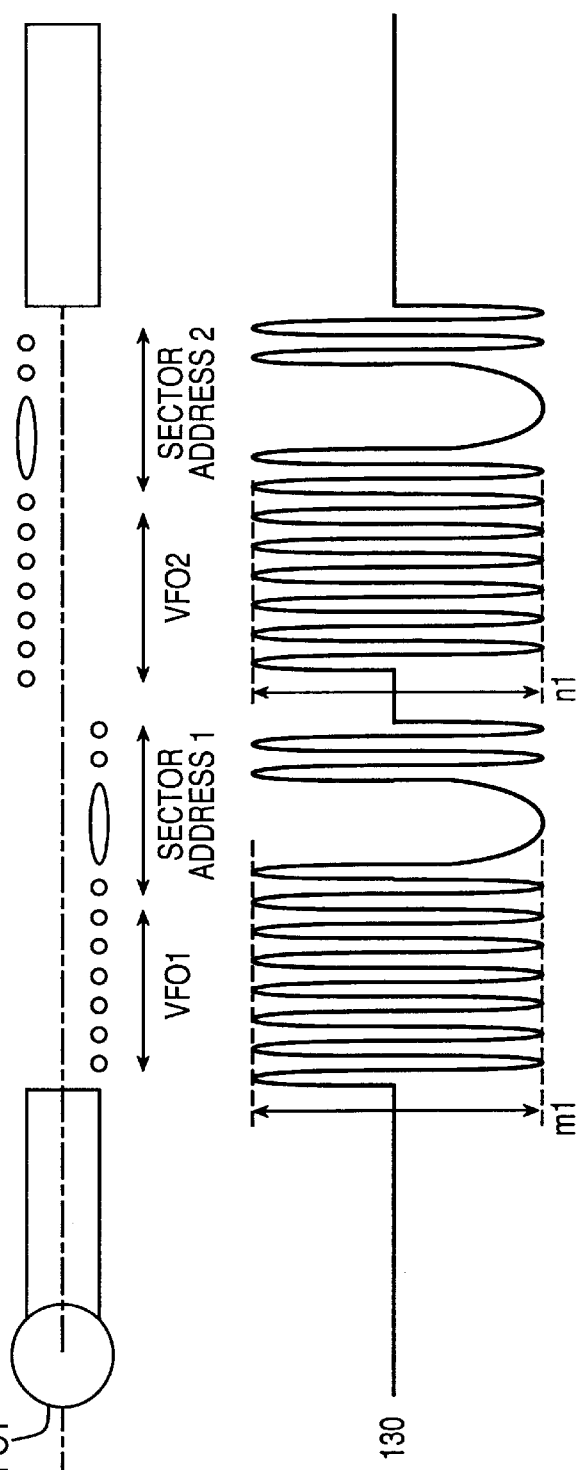
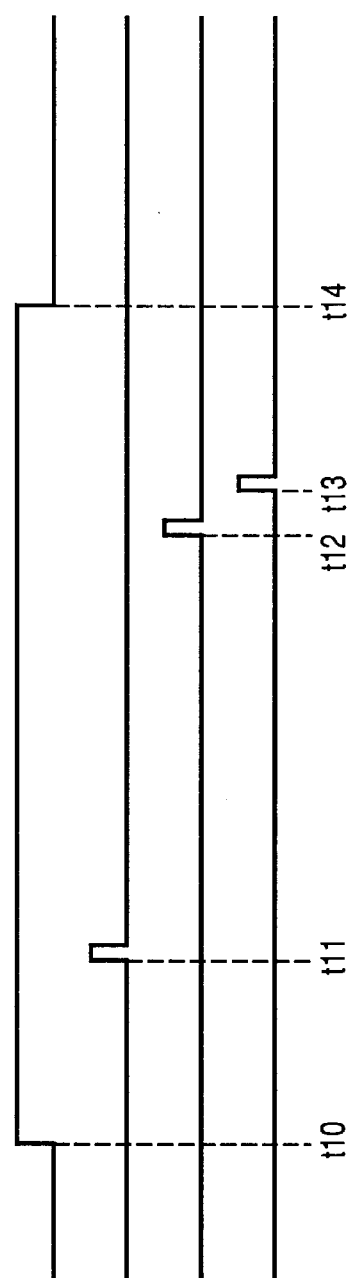
*Fig.6A*
*Fig.6B*
*Fig.6C*
*Fig.6D*
*Fig.6E*
*Fig.6F*

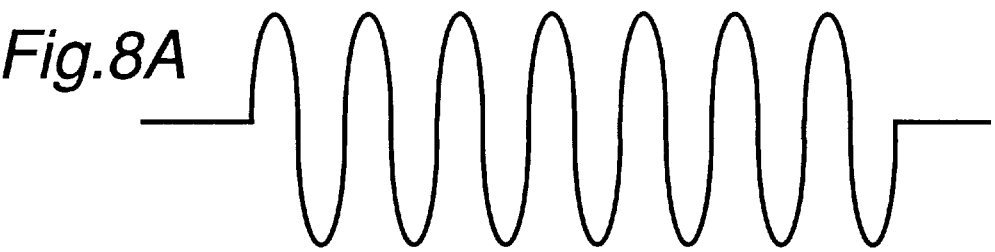
Fig.8A
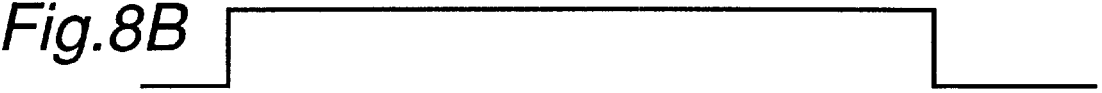
Fig.8B
Fig.8C ZERO LEVEL
Fig.8D ZERO LEVEL
Fig.8E ZERO LEVEL

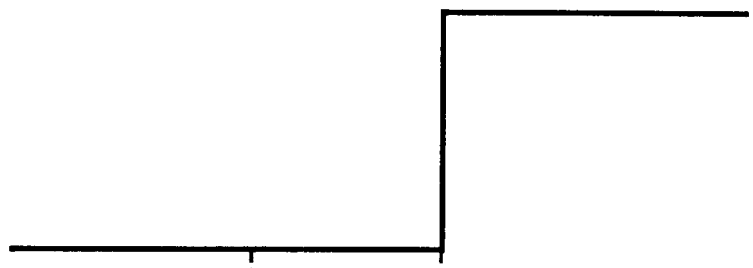
Fig.39A
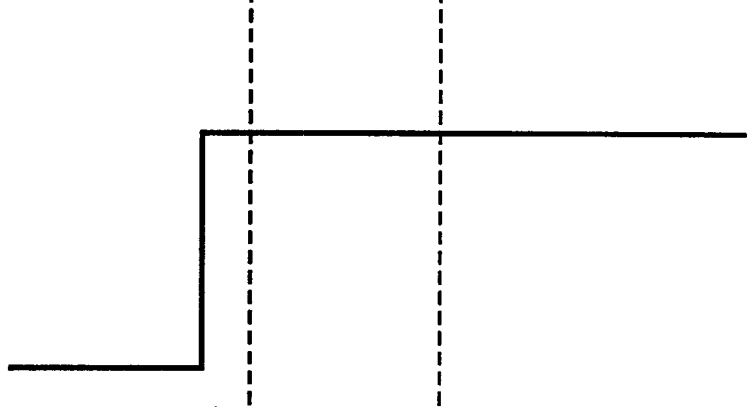
Fig.39B
Fig.39C
Fig.39D
Fig.39E
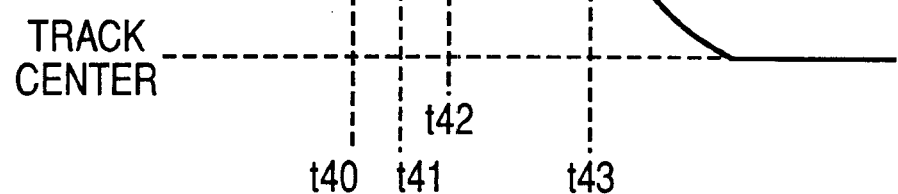
TRACK CENTER
t40  t41  t42  t43

US 6,459,664 B1

OPTICAL DISC TILT CONTROL APPARATUS

BACKGROUND OF THE INVENTION

1. Field of the Invention

The present invention relates to an optical disc tilt control apparatus, and more particularly, to an apparatus for controlling the inclination of the optic axis of an optical pickup with respect to the information surface of an optical disc.

2. Description of the Related Art

In some prior art optical disc apparatuses, reproduction of a signal recorded on the optical disc is performed by causing to converge onto an optical disc that is rotating with a prescribed rotational speed a light beam that is generated from a light source such as a semiconductor laser. An example of an optical disc will be described with reference to FIG. 35. A plurality of tracks are formed on the disc in spiral fashion. FIG. 35 is a diagram showing the cross-section of a disc. Tracks are formed by grooves and lands. Each groove or each land constitutes a track. The track pitch is 0.74 micrometers (hereinbelow abbreviated as $\mu$m). A recording film consisting of phase changing material etc. is affixed to the recording surface. When information is recorded on the disc, the coefficient of reflectivity of the recording film changes due to changes in the intensity of the light beam that are produced in accordance with the information whilst tracking control is exercised such that the light beam is always positioned on the track. When the information on the track is reproduced, the reflected beam from the optical disc is photodetected by a photodetector whilst exercising tracking control such that the light beam is positioned on the track. The information is reproduced by processing the output of the optical detector.

The addresses will be described with reference to FIG. 36.

The portions indicated by a sequence of "pits" constitute the header field.

The "pits" are of land shape. The header field is arranged at the head of each sector. The sequence of pits is arranged at a position between a land track and a groove track. This arrangement of the header field is generally called CAPA (Complementary Allocated Pit Addressing). The header field is constituted by a variable frequency oscillator (hereinbelow abbreviated to VFO) and sector address. VFO1 and VFO2 are recorded at a single frequency and are employed to pull in the phase locked loop (hereinbelow called PLL). Sector address 1 indicates the address of the groove sector and sector address 2 indicates the address of the land sector.

The disc is divided in the radial direction into several zones. The number of sectors per track in each zone is fixed. Going from the inner circumferential to the outer circumferential zone, the number of sectors per track increases.

When performing information recording, this is performed after exercising control such that the speed of rotation of the disc is a speed of rotation corresponding to the respective zone. The linear speed in each zone is therefore practically constant. The region apart from the header field is a region in which information re-writing can be performed. Hereinbelow it is termed the "re-writable region".

Detection of the offset of a track and the light beam for tracking control is likewise obtained from the reflected light from the disc. A tracking error detection system generally called the "push-pull" system will now be described.

Hereinbelow, tracking error is abbreviated as TE. The push-pull method is also called the "far field" method. This is a system in which the TE signal is detected by using a photodetector divided into two photodetection sections arranged symmetrically with respect to the track center to extract as output difference the light reflected and diffracted by guide grooves on the disc. As shown in FIG. 37, a left-right symmetrical reflection/diffraction distribution is obtained when the spot of the light beam coincides with the center of the land or the center of the groove. Otherwise, the optical intensity is different for left and right. FIG. 38 shows the output difference of the outputs from two sections of the photodetector divided into two when the spot crosses a track. The TE signal becomes zero at the center of the land track or the center of the groove track. Tracking control is performed by moving the spot on the disc in the direction orthogonal to the track in accordance with the TE signal. Movement of the spot of the light beam in the direction at right angles to the track is achieved by moving a converging lens by means of a tracking actuator.

The TE signal characteristic shown by the solid line in FIG. 38 shows the case where the optic axis of the light beam is perpendicular to the information surface of the disc. The case where the optic axis of the light beam is inclined in the radial direction of the disc is shown by the dotted lines. Hereinbelow, the inclination of the radial direction of the optic axis of the light beam from a surface perpendicular to the information surface of the disc will be called the "radial tilt".

The phase of the TE signal is offset by the radial tilt. Specifically, the spot is offset from the center of the track even if tracking control is exercised such that the TE signal becomes zero. With NA=0.6, wavelength 650 nm, track pitch 0.6 $\mu$m, groove depth of wavelength/6, and 50% duty of lands and grooves, an inclination of 1° generates a tracking error of about 0.13 $\mu$m. Some differences are produced by differences in the Gaussian optical intensity distribution of the light beam. In some optical disc apparatuses, a radial tilt of about 1° may be produced by inclination of the disc or inclination of the turntable etc. of the disc motor.

As described above, if a radial tilt of about 1° is produced by disc inclination or inclination of the turntable etc. of the disc motor etc., this generates a tracking error of 0.13 $\mu$m, so reproduction of information becomes unstable and during recording the information of adjacent tracks may be erased.

SUMMARY OF THE INVENTION

An object of the present invention is to provide an optical disc apparatus wherein stable reproduction of information can be achieved even when radial tilting has occurred and wherein there is no possibility of the information of adjacent tracks being erased when recording.

An optical disc apparatus according to the present invention for achieving the above object comprises: means for reproduction signal detection that detect information recorded on a disc by convergently directing a light beam onto a disc on which there are arranged a first pit sequence formed in a position offset in one direction orthogonal to a track and a second pit sequence formed in a position offset in the other direction orthogonal to the track; first means for detecting tracking error that detect positional offset of the track and the light beam by a push-pull method; second means for detecting tracking error that detect positional offset of the track and the light beam from the reproduction signals of the first pit sequence and of the second pit sequence output by the means for reproduction signal detection; means for effecting movement that effect movement such that the light beam moves transversely across the track; means for tracking control that control the means for effecting movement in accordance with the output of the first means for detecting tracking error such that the light beam is positioned on the track; and means for correction by altering the target position of the means for tracking control in accordance with the output of the second means for detecting tracking error.

There are also provided: means for reproduction signal detection that detect information recorded on a disc by convergently directing a light beam onto a disc on which there are arranged a first pit sequence formed in a position offset in one direction orthogonal to a track and a second pit sequence formed in a position offset in the other direction orthogonal to the track; first means for detecting tracking error that detect positional offset of the track and the light beam by a push-pull method; second means for detecting tracking error that detect positional offset of the track and the light beam from the reproduction signals of the first pit sequence and of the second pit sequence output by the means for reproduction signal detection; means for effecting movement that effect movement such that the light beam moves transversely across the track; means for angle variation that change the angle of incidence of the light beam that is directed onto the information surface; means for tracking control that control the means for effecting movement in accordance with the output of the first means for detecting tracking error such that the light beam is positioned on the track; means for correction by altering the target position of the means for tracking control in accordance with the output of the second means for detecting tracking error; and means for angle control that control the means for angle variation in accordance with the output of the first means for detecting tracking error when the means for correction are actuated.

With an optical disc apparatus according to the present invention, with the above construction, the target position of tracking control using a TE signal obtained by a push-pull method is corrected using a second TE signal that detects positional offset of the light beam and the track using the reproduction signal when the light beam passes over the first pit sequence formed in a position offset in one direction orthogonal to the track and a second pit sequence formed in a position offset in the other direction orthogonal to the track, so tracking offset due to radial tilt can be corrected and the spot controlled to the center of the track.

Also, since radial tilt is controlled using a TE signal obtained by a push-pull method when the target position of tracking control using a TE signal obtained by a push-pull method is corrected using a second TE signal that detects positional offset of the light beam and the track using the reproduction signal when the light beam passes over the first pit sequence formed in a position offset in one direction orthogonal to the track and the second pit sequence formed in a position offset in the other direction orthogonal to the track, the optic axis of the light beam becomes perpendicular to the information surface of the disc.

BRIEF DESCRIPTION OF THE DRAWINGS

FIGS. 2A and 2B are a view showing the totally reflected light amount and the layout of a header field according to the first embodiment;

FIGS. 3A and 3B are a view showing the totally reflected light amount and the layout of a header field according to the first embodiment;

FIGS. 6A, 6B, 6C, 6D, 6E and 6F are a waveform diagram given in explanation of the gate signal of a gate signal generating circuit according to the first embodiment;

FIGS. 8A, 8B, 8C, 8D and 8E are a waveform diagram given in explanation of the absolute value detection circuit according to the first embodiment;

FIGS. 39A, 39B, 39C, 39D and 39E are a waveform diagram given in explanation of the operation of LPF 153 shown in FIG. 10;

DESCRIPTION OF THE PREFERRED EMBODIMENTS

Figure 1:
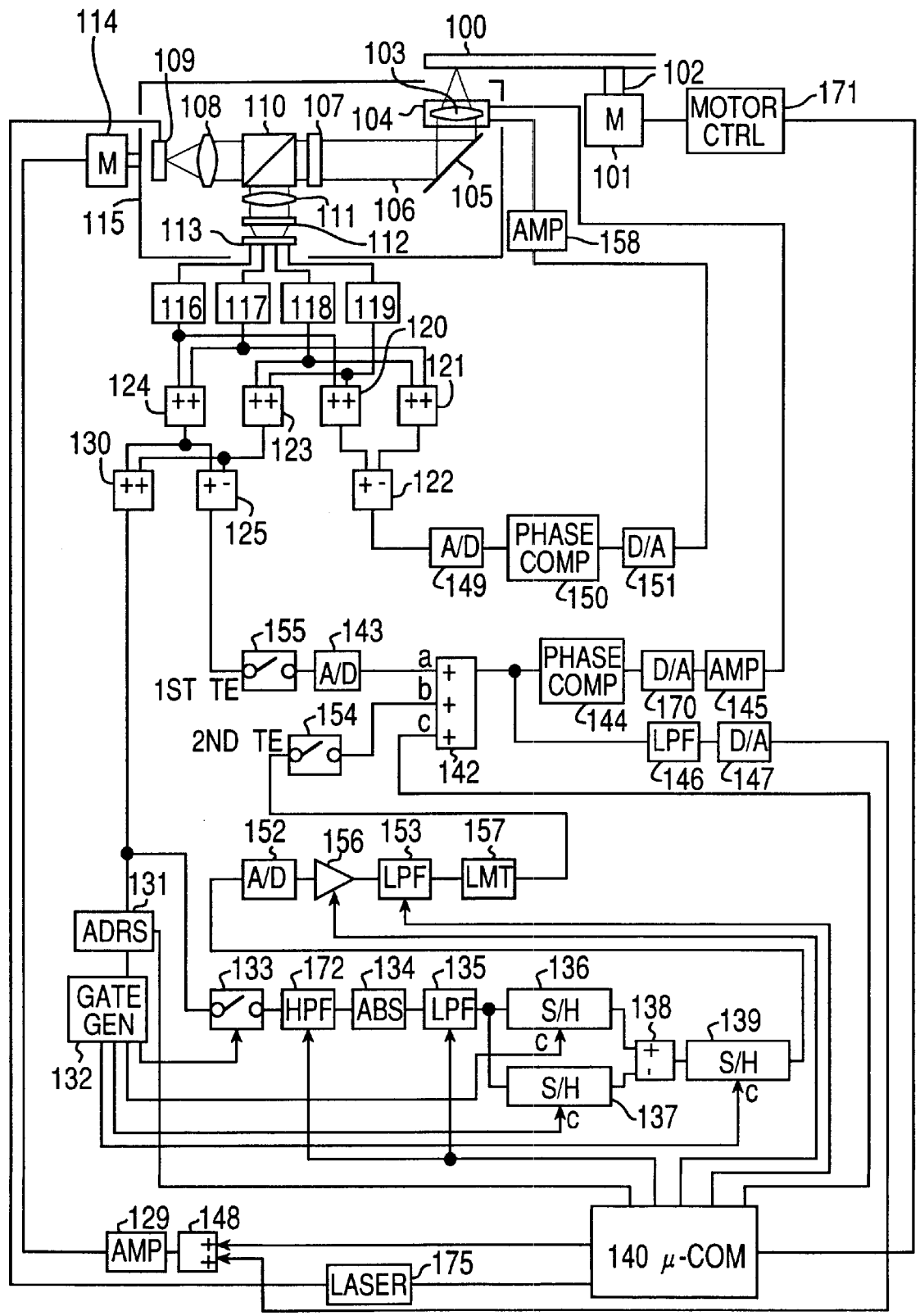
FIG. 1 is a block diagram of an optical disc apparatus according to a first embodiment of the present invention.

Embodiments of the present invention are described below with reference to the drawings.

First Embodiment

The first embodiment of the present invention is described below with reference to FIG. 1, which is a block diagram thereof.

Disc 100 is mounted on a rotary shaft 102 of a motor 101 and is rotated at a prescribed speed of rotation.

Disc 100 has tracks connected continuously in spiral fashion. The land tracks and groove tracks occur alternately after one turn. The lands and grooves together constitute tracks on which information is recorded. The pitch of the tracks is 0.6 μm. Also, the width of each land or each groove is about 0.6 μm.

In a moving cradle 115 there are mounted a laser 109, coupling lens 108, polarizing beam splitter 110, ¼ wavelength plate 107, totally reflecting mirror 105, photodetector 113, and actuator 104. Mobile cradle 115 is arranged such that it is moved in the radial direction of disc 100 by a feed motor 114.

A light beam 106 that is generated by laser 109 mounted on moving cradle 115 is converted into a parallel beam by coupling lens 108, and then passed through polarizing beam splitter 110 and ¼ wavelength plate 107 before being reflected by totally reflecting mirror 105 and made to converge onto the information surface of disc 100 by means of converging lens 103.

The reflected light that is reflected by the information surface of disc 100 passes through converging lens 103 and is reflected by totally reflecting mirror 105, passes through ¼ wavelength plate 107, polarizing beam splitter 110, detection lens 111 and cylindrical lens 112 before being input onto a photodetector 113 comprising four photodetection sections. Converging lens 103 is mounted on a movable portion of actuator 104. Focus control has no direct relationship with the present invention so a description thereof is omitted. Actuator 104 comprises a focusing coil, tracking coil, permanent magnet for focusing and permanent magnet for tracking. Consequently, when voltage is applied to the focusing coil (not shown) of actuator 104 using power amplifier 158, a current flows in the coil, with the result that the coil is subjected to magnetic force from the permanent magnet (not shown) for focusing. Converging lens 103 is thereby moved in the direction perpendicular to the plane of disc 100 (vertical direction in the Figure). Converging lens 103 is controlled in accordance with a focus error signal indicating the offset of the light beam focal point and the disc information surface so that the focal point of light beam 106 is always positioned on the information surface of disc 100.

Also, when voltage is applied to the tracking coil (not shown) using power amplifier 145, current flows to the coil, causing it to be subjected to magnetic force from the permanent magnet for tracking (not shown). Accordingly, converging lens 103 is moved in the radial direction of disc 100 i.e. across the tracks on discs 100 (left/right in the Figure).

Photodetector 113 is formed of four photodetection sections. Reflected light from the disc that is input into photodetector 113 is there converted into respective currents, which are fed to I/V converters 116, 117, 118 and 119. I/V converters 116, 117, 118 and 119 convert the input current to a voltage corresponding to the current level.

Adders 120, 121, 123, 124, and 130 add up and output the input signals. Subtractors 122 and 125 subtract and output the input signals.

The output of subtractor 122 is the focus error signal, which indicates the offset of the focal point of the light beam that is directed onto the disc and the information surface of disc 100. The focus error signal is sent to analogue/digital converter 149, phase compensation circuit 150, digital/analogue converter 151, and power amplifier 158. Current is supplied to the focusing coil of actuator 104 by power amplifier 158.

Analogue/digital converter 149 (hereinbelow called an A/D converter) converts an analogue signal to a digital signal. Digital/analogue converter 151 (hereinbelow called a D/A converter) converts a digital signal to an analogue signal.

Phase compensation circuit 150 is a digital filter that stabilizes the focus control system. Consequently, converging lens 103 is driven in accordance with the focus error signal, so that the focal point of the light beam is always positioned on the information surface.

The optical system shown in FIG. 1 constitutes a TE signal detection system generally referred to as the push-pull method. The output of subtractor 125 is therefore a TE signal indicating the offset of the spot of the light beam that is directed onto the disc and the track on disc 100. Hereinbelow the output of subtractor 125 will be called the first TE signal. The first TE signal is sent to switch 155, A/D converter 143, adder 142, phase compensation circuit 144, D/A converter 170, and power amplifier 145. Current is supplied to the tracking coil of actuator 104 by power amplifier 145.

Phase compensation circuit 144 is a digital filter that stabilizes the tracking control system. Converging lens 103 is therefore driven in accordance with the first TE signal such that the spot of the light beam always follows the track.

Also, the first TE signal is sent to power amplifier 129 through low-pass filter 146, D/A converter 147 and adder 148. Consequently, feed motor 114 is controlled in accordance with the low-frequency component of the first TE signal. That is, in the tracking control system, high-frequency external disturbances are suppressed by actuator 104 while low-frequency external disturbances are suppressed by feed motor 114.

Adder 130 adds the output of adder 123 and adder 124. That is, the output of adder 130 is the total photodetection amount of photodetector 113. Hereinbelow, the output signal of adder 130 is called the total reflected light amount signal. The output of adder 130 is sent to address reproduction circuit 131. Address circuit 131 generates a sector address, which it sends to microcomputer 140. It also sends a signal synchronized with the address to gate generating circuit 132.

Gate generating circuit 132 outputs an ID signal (see FIG. 6C) which is high-level in the address section to switch 133. This ID signal is a signal that rises after the lapse of a prescribed time from the end time-point of the previous address section. Also, immediately after VFO1 of the address section, a pulse (see FIG. 6D) is generated and this pulse is output to a sample-hold circuit 136 (hereinbelow abbreviated to S/H circuit). Hereinbelow this pulse is termed the VFO1 signal. Also, immediately after VFO2 of the address section, a pulse (see FIG. 6E) is generated and this pulse is output to a sample-hold circuit 137. Hereinbelow this pulse is termed the VFO2 signal. Also, immediately after the VFO2 signal, a pulse (see FIG. 6F) is generated and this pulse is output to a sample-hold circuit 139. Hereinbelow this pulse is termed the data update signal. The VFO1 signal, VFO2 signal and data update signal are all pulses that are output after the lapse of respective prescribed times after the rising edge of the ID signal. Gate generating circuit 132 is provided with a counter that counts these times.

Switch 133, HPF 172, absolute value circuit 134, LPF 135, S/H circuits 136, 137, 139 and subtractor 138 constitute a circuit for detecting the second TE signal. The output of the S/H circuit 139 is the second TE signal.

The second TE signal is converted to a digital signal by A/D converter 152 and sent to adder 142 through multiplier 156, LPF 153, limiter 157 and switch 154.

The operation of microcomputer 140 when tracking control is actuated will now be described.

In the initial condition, microcomputer 140 actuates tracking control by closing switch 155 in a condition with switch 154 open. Converging lens 103 is driven in accordance with the first TE signal.

Address reproduction circuit 13 reads the address and sends the address to microcomputer 140. Microcomputer 140 identifies the zone based on the address. It then sends an instruction to motor control circuit 171 to make the speed of rotation of disc 100 a speed of rotation corresponding to that zone. When the speed of rotation of disc 100 reaches the prescribed speed of rotation, address reproduction circuit 131 sends a signal synchronized with the address to gate generating circuit 132.

Gate generating circuit 132 outputs an ID signal, VFO1 signal, VFO2 signal and data update signal. The VFO1 signal is sent to S/H circuit 136, where the front half portion of the CAPA, for example the reproduction signal at the VFO1 portion is sampled. The VFO2 signal is sent to S/H circuit 137, where the latter half portion of the CAPA, for example the reproduction signal at the VFO2 portion is sampled. For the data update signal, the signal level difference of the signals that are held in S/H circuit 136 and S/H circuit 137 is calculated by subtractor 138 immediately after (for example, after a few $\mu$ to a few tens of $\mu$sec) the VFO2 signal and this difference is held in S/H circuit 139.

The second TE signal is therefore output from S/H circuit 139.

Microcomputer 140 holds switch 155 closed and in addition corrects the target position of the tracking control system that is actuated in response to the first TE signal in accordance with the second TE signal. An offset based on the second TE signal is applied to the tracking control system by adder 142.

Each block is described in detail below.

First of all the method of detection of the second TE signal is described using FIG. 2.

The case is shown in which the spot is moving along the center of the groove track.

The amount of light reflected from the disc is modulated by the pits. The output of adder 130 is shown at waveform B. Since the distance L1 of the centerline of the pit sequence of VFO1 and the path followed by the center of the spot and the distance L2 of the centerline of the pit sequence of VFO2 and the path followed by the center of the spot are equal, the amplitude m1 at VFO1 and the amplitude n1 at VFO2 are equal.

The case where the spot is moving along a line between a center line of one track and a center line of another track is shown in FIG. 3.

The output of adder 130 is shown as waveform B. In the case of FIG. 3, the distance L1 of the pit sequence of VFO1 and the spot is shorter than the distance L2 of the pit sequence of VFO2 and the spot so the amplitude m2 at VFO1 is larger than the amplitude n2 at VFO2.

Figure 4A:
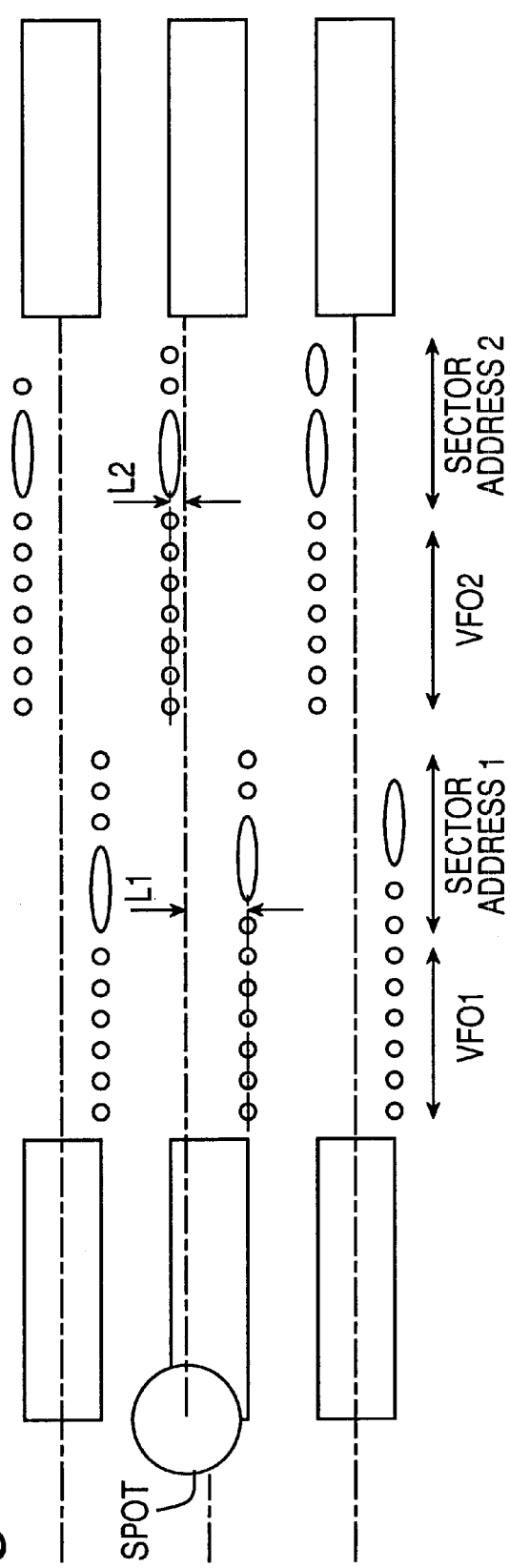
FIGS. 4A and 4B are a view showing the totally reflected light amount and the layout of a header field according to the first embodiment.

The case where the spot is positioned at the central position of one track and another track is shown in FIG. 4.

The output of adder 130 is shown as waveform B. In the case of FIG. 4, the distance L1 of the pit sequence of VFO1 and the spot is longer than the distance L2 of the pit sequence of VFO2 and the spot so the amplitude m3 is larger than the amplitude n3 at VFO2.

As shown in FIG. 2, 3 and 4, the offset of the spot and the track can be detected by detecting the difference in amplitude of the total reflection light amount signal at VFO1 and VFO2.

Figure 5:
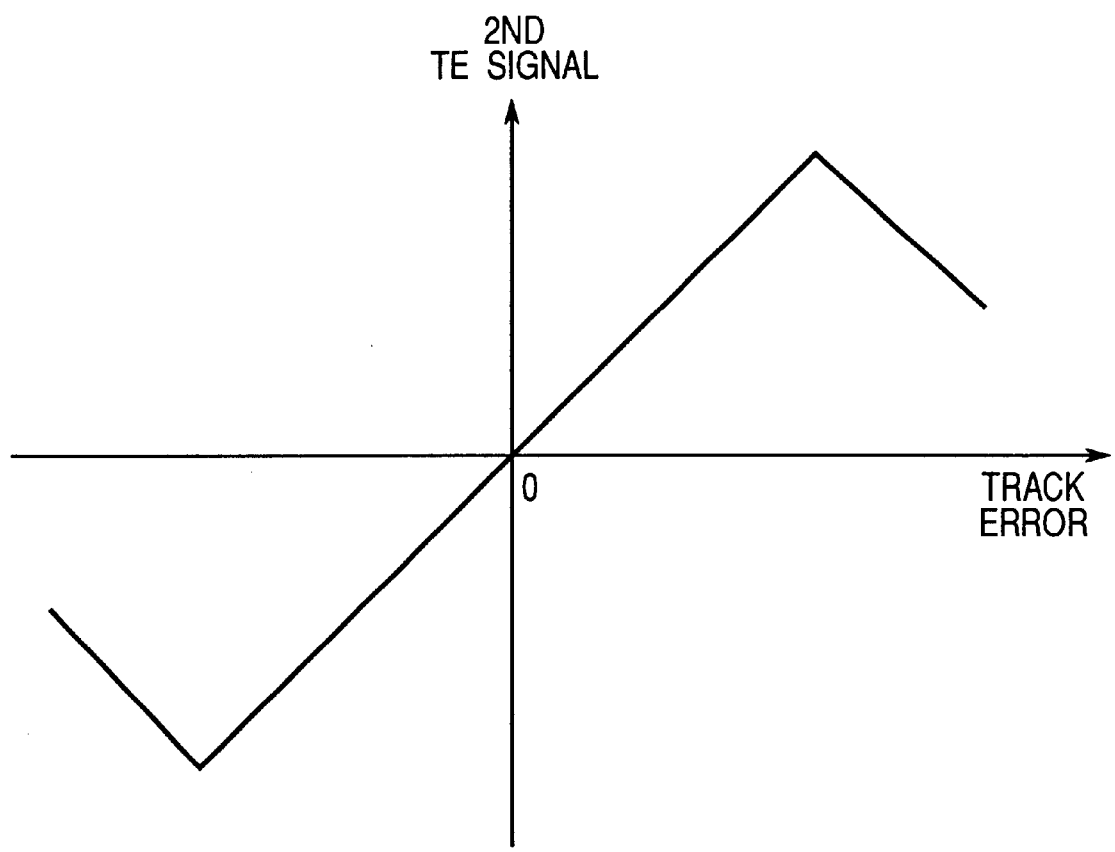
FIG. 5 is a waveform diagram given in explanation of the second TE signal according to the first embodiment.

FIG. 5 shows the relationship of the tracking error and the second TE signal. It should be noted that the inclinations of the second TE signal with respect to the tracking error are opposite since the amount of the offsets of VFO1 and VFO2 from the center of the track are opposite in the case of the land track and the groove track, respectively.

Next, the system for detecting the amplitude of the total reflected light amount signal in VFO1 and VFO2 will be described.

FIG. 6 shows the relationship of the signal that is output by gate generating circuit 132 and the output waveform of adder 130.

A shows the relationship of the spot and the header field. Waveform B shows the output of adder 130, waveform C the ID signal, waveform D the VFO1 signal, waveform E the VFO2 signal, and waveform F the data update signal, respectively.

Based on the address synchronization signal that was output by address reproduction circuit 131 in the previous sector, gate generating circuit 132 respectively generates the ID signal, VFO1 signal, VFO2 signal, and data update signal in the next sector. It is provided in its interior with an oscillator and with a counter that counts the output of this oscillator. In response to an address synchronization signal the counter is cleared and a gate signal is generated based on the counter value.

The ID signal become high-level in the header field from the time t10 to the time t14. The VFO1 signal is a pulse signal that becomes high-level at the time t11 which is at the end of VFO1. The VFO2 signal is a pulse signal that becomes high-level at the time t12 which is at the end of VFO2. The data update signal is a pulse signal that becomes high-level at a time t13 which is immediately after the VFO2 signal.

When the ID signal goes to high-level, switch 133 is closed. Consequently the output of adder 130 is input into absolute value circuit 134 through HPF 172. Absolute value circuit 134 outputs the absolute value of its input signal with reference to zero level. HPF 172 removes the DC component. LPF 135 removes high-frequency components of the input signal from the output.

The output levels of LPF 135 are levels corresponding to m and n shown in FIG. 2, 3 and 4. S/H circuit 136 goes into sampling condition when its control terminal c becomes high-level and assumes the hold condition when it becomes low-level. S/H circuits 137 and 139 are of identical construction.

The output of LPF 135 at time t11 is therefore held and output. The output of S/H circuit 136 at this time-point therefore has the values m1, m2, m3 respectively in FIG. 2, 3 and 4. Likewise the output of LPF 135 at time t12 is held and output by S/H circuit 137. The output of S/H circuit 137 at this time-point therefore has the values n1, n2, n3 respectively in FIG. 2, 3 and 4.

Subtractor 138 outputs the difference of the outputs of S/H circuits 136 and 137. Specifically, the output of the subtractor after the time t12 indicates the value (m-n).

S/H circuit 139 holds and outputs the output of subtractor 138 at time t13.

Consequently, the output of S/H circuit 139 indicates the amplitude difference of the total reflection amount signal in VFO1 and the total reflection amount signal in VFO2. That is, it constitutes the second TE signal.

Figure 7:
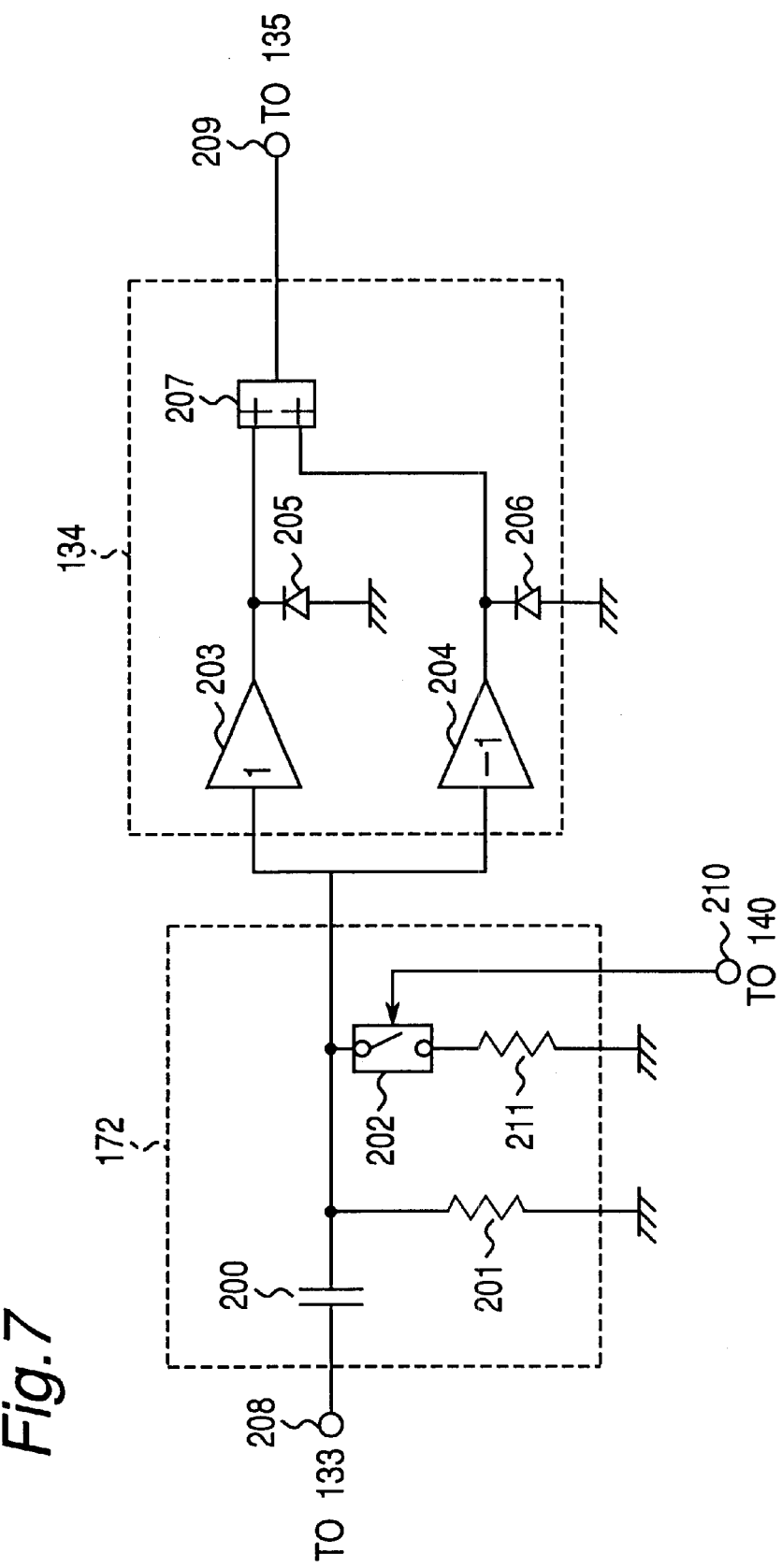
FIG. 7 is a block diagram of an absolute value detection circuit 134 according to the first embodiment.

HPF 172 and absolute value circuit 134 will now be described using FIG. 7. HPF 172 is constituted by capacitor 200, resistances 201, 211 and switch 202. Also, absolute value circuit 134 is constituted by amplifiers 203, 204, diodes 205, 206 and adder 207. Terminal 208 is connected to switch 133 and terminal 209 is connected to LPF 135. Also, terminal 210 is connected to microcomputer 140.

When terminal 210 is high-level, switch 202 is closed and when it is low-level it is opened. That is, the time constant of the HPF can be changed over.

The output of the HPF is sent to amplifier 203 of gain 1 and to amplifier 204 of gain –1. Diodes 205 and 206 are connected to amplifiers 203 and 204. Consequently, when the outputs of amplifiers 203 and 204 are negative, output is zero. The outputs of amplifiers 203 and 204 are sent to adder 207. The output of adder 207 is sent to terminal 209.

The operation will now be described with reference to FIG. 8. Waveform A indicates the waveform that is input to terminal 208; waveform B indicates the ID signal; waveform C indicates the output of amplifier 203; waveform D indicates the output of amplifier 204; and waveform B indicates the output of adder 207. Terminal 210 is low-level.

The output of adder 207 is a waveform converted to absolute value based on the center of the amplitude of the totally reflected light amount signal of the VFO sections.

Figure 9:
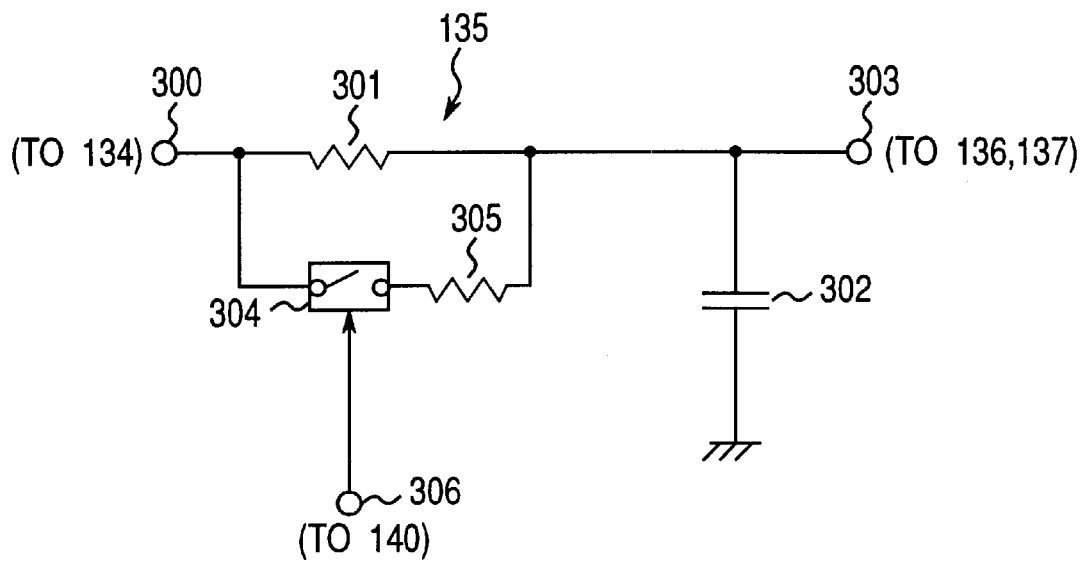
FIG. 9 is a block diagram of LPF 135 according to the first embodiment.

LPF 135 will now be described using FIG. 9. Terminal 300 is connected to absolute value circuit 134. Terminal 303 is connected to S/H circuits 136, 137. Terminal 306 is connected to microcomputer 140. An LPF is constituted by resistances 301, 305 and capacitor 302. Switch 304 is arranged such that it is closed when terminal 306 is set to high-level and opened when this is low-level. The time-constant can thereby be changed over. LPF 135 removes high-frequency components generated by pits of the waveform shown in FIG. 8E constituting the output signal of absolute value circuit 134 constituted as above. The output of LPF 135 therefore indicates the amplitude of the totally reflected light amount signal in the VFOs.

Next, the block wherein the second TE signal is added to the tracking control system will be described.

After being converted to a digital signal by A/D converter 152, the second TE signal is sent to LPF 153 through multiplier 156.

Figure 10:
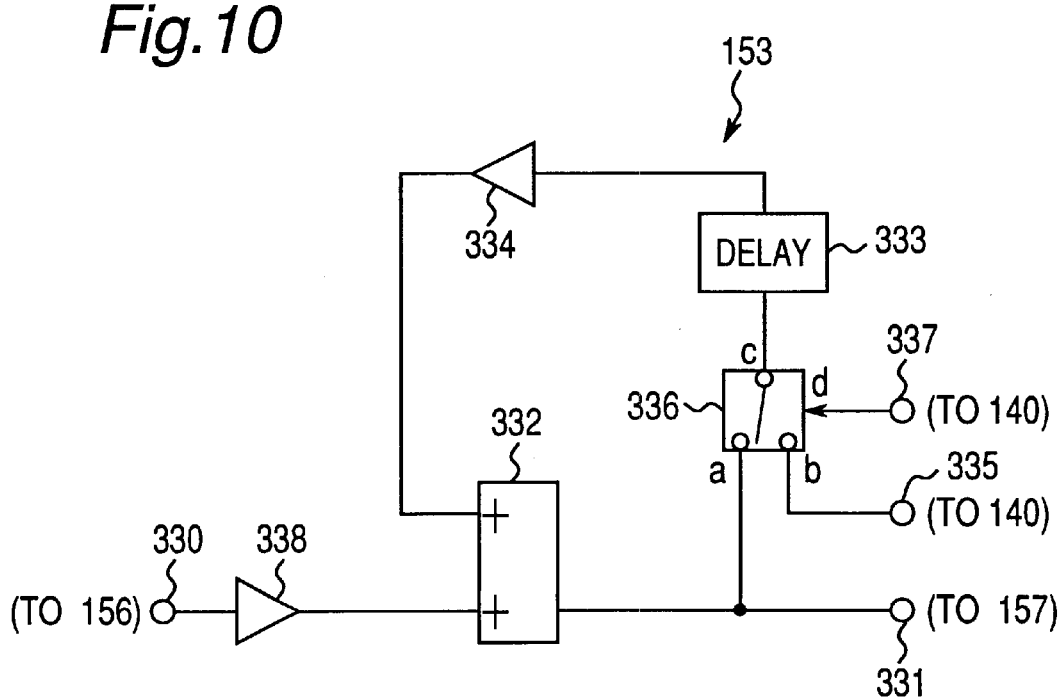
FIG. 10 is a block diagram of LPF 153 according to the first embodiment.

FIG. 10 shows a block diagram of LPF 153 which is constituted by a digital filter.

Terminal 330 is connected to multiplier 156. Also, terminal 331 is connected to limiter 157. Terminals 335 and 337 are connected to microcomputer 140. Multipliers 334 and 338 output their input signals after multiplication by a coefficient. Delay circuit 333 outputs the input signal delayed by the time of period T. The respective circuits perform processing with digital values synchronized with reference clocks of period T.

Figure 11A:
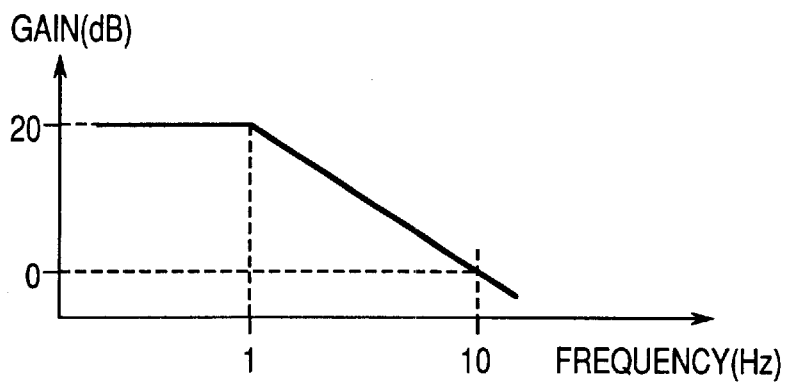
FIGS. 11A and 11B are a characteristic diagram of LPF 153 according to the first embodiment.
Figure 11B:
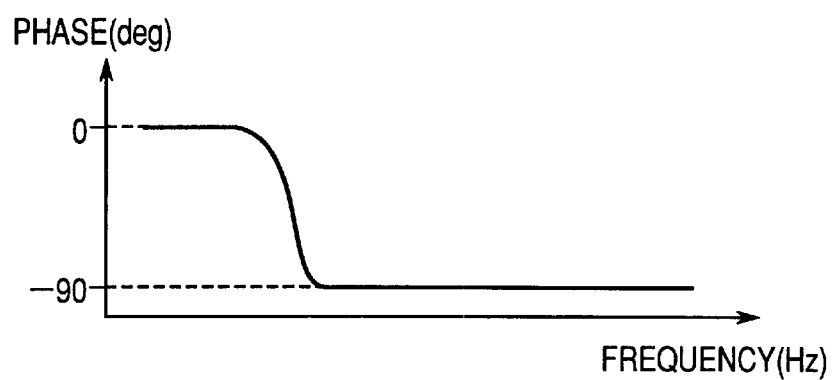

FIG. 11 shows the gain and phase characteristic of the filter. Characteristic A shows the gain characteristic. Decibels (dB) are shown along the vertical axis. The logarithm (Log) of the frequency is shown along the horizontal axis. The characteristic is flat up to 1 Hz but is –20 dB/dec at above 1 Hz. At 10 Hz it is 0 dB. Characteristic B indicates the phase characteristic. The vertical axis shows the phase in degrees. The horizontal axis is the same as in the case of characteristic A.

Next, the difference in the characteristic of the tracking control system when the second TE signal is added to the tracking control system will be described. Specifically, this is the characteristic in the condition with switch 154 closed.

Figure 12:
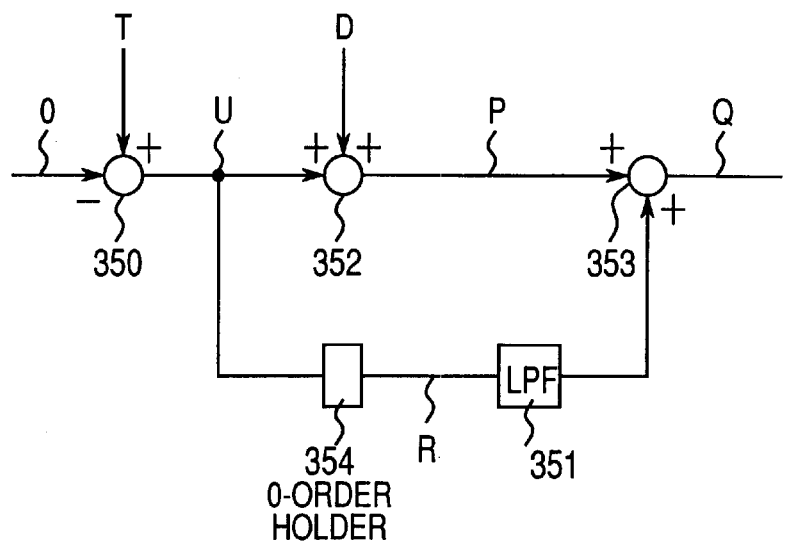
FIG. 12 is a block diagram of a tracking control system according to the first embodiment.

Let us denote the output of adder 125, which is the first TE signal, by P, the output of adder 142 by Q, and the output of S/H circuit 139, which is the second TE signal, by R. A block diagram is shown in FIG. 12.

Signal line O indicates the position of the spot. Signal line T indicates the position of the track. The output of subtractor 350 indicates the offset of the spot and track. Signal U is a signal that indicates the true offset of the spot and track. Hereinbelow the signal U will be called the true tracking error signal. The true tracking error signal U is sent to adder 353 through order holder 354 and LPF 351. The output of the order holder 354 indicates the second TE signal. LPF 351 corresponds to LPF 153 in the digital filter mentioned above order holder 354 corresponds to the second TE signal being the signal detected solely in the address section.

Signal D indicates the offset produced by the radial tilt described above. The output of adder 352 therefore indicates the first TE signal.

Figure 13A:
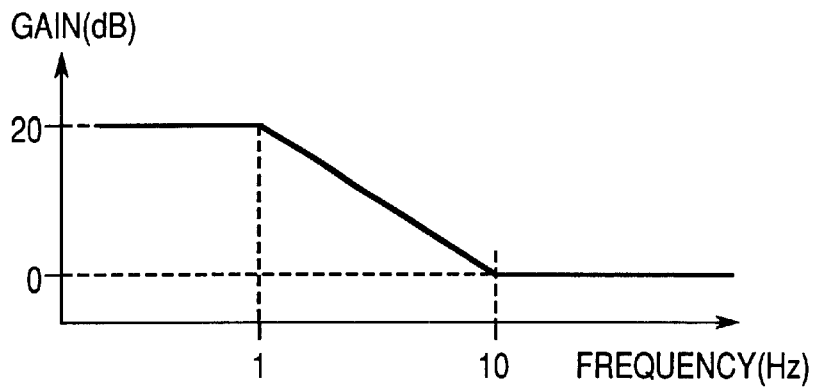
FIGS. 13A and 13B are a characteristic diagram of a tracking control system according to the first embodiment.
Figure 13B:
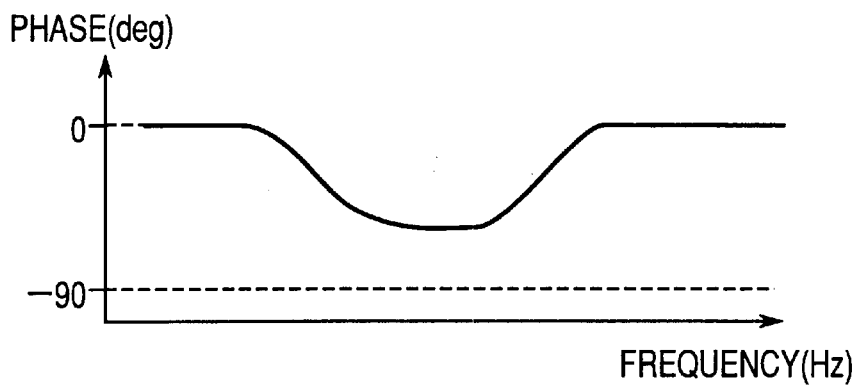

The transfer characteristic of signal line U and signal line Q is shown in FIG. 13. The level of signal line D is taken to be zero. Characteristic A indicates the gain. Decibels (dB) are shown along the vertical axis. The logarithm (Log) of the frequency is shown along the horizontal axis. The characteristic is flat up to 1 Hz but is −20 dB/dec at above 1 Hz. At 10 Hz it is 0 dB. At more than 10 Hz it is 0dB.

Characteristic B indicates the phase characteristic. The vertical axis indicates the phase in degrees. The horizontal axis is the same as in the case of characteristic A.

In the case of a tracking control system using only the first TE signal i.e. when switch 154 is open the gain is 0 dB irrespective of the frequency. Consequently the gain becomes high at under 10 Hz due to closure of switch 154. At frequencies below 10 Hz, the second TE signal becomes governing. Since the second TE signal is a signal obtained by passing the true tracking error signal through the O-order holder, it is not subject to the effect of signal line D. Consequently the effect of signal line D is decreased, enabling the spot to follow the center of the track even though there is radial tilting.

The effect of reducing the influence of radial tilting will now be described using the block diagram of FIG. 14. In block 383, a filter for phase compensation, a drive circuit and a tracking actuator are integrally combined. G is the transfer function. The output of block 383 indicates the position of the spot. Block 382 indicates the circuit which is a combination of LPF 351 and O-order holder 354. K is the transfer function. Multiplier 380 for multiplying −1 is an inverting amplifier for providing negative feedback.

Let the output of block 383 be V.

The transfer function in respect of offset D generated by radial tilt is indicated as follows:

$$V/D = -G/(1+(1+K)*G)$$

The transfer function with no correction by the second TE signal is given as follows:

$$V/D = -G/(1+G).$$

Since the gain G is much larger than 1, the effect on the output D of correction by the second TE signal is reduced by a factor of about 1/K Since the gain K is 20 dB at below 1 Hz, the effect of offset D is reduced by a factor of 1/10 at below 1 Hz.

Feed-forward processing will now be described.

Address reproduction circuit 131 reads the address and sends the address to microcomputer 140. Microcomputer 140 identifies the zone in accordance with the address. It then sends an instruction to motor control circuit 171 to make the speed of rotation of disc 100 a speed of rotation corresponding to that zone. When the speed of rotation of disc 100 reaches the prescribed speed of rotation, address reproduction circuit 131 sends a signal synchronized with the address to gate generating circuit 132.

Gate generating circuit 132 outputs an ID signal, VFO1 signal, VFO2 signal and data update signal. Consequently, the second TE signal is output from S/H circuit 139.

Thus, when there is radial tilting of the DC component, the second TE signal, which is the output of S/H circuit 139, has an offset corresponding to the radial tilt. However, it takes a few milliseconds before the response becomes stable after the closure of switch 154. The reason is explained below.

From the characteristic of FIG. 13, the frequency at which the gains of the first TE signal and second TE signal become equal is 10 Hz. The reason for setting this frequency is that this is limited by the frequency of detection of the second TE signal, which is determined by the number of sectors per track and the speed of rotation. The band of the correction by the second TE signal is therefore restricted to a few tens of Hz.

Accordingly, microcomputer 140 sets the initial value of LPF 153 in accordance with the second TE signal immediately before closure of switch 154.

The operation is described in detail below. The offset D generated by the radial tilt is assumed to be fixed.

Figure 14:
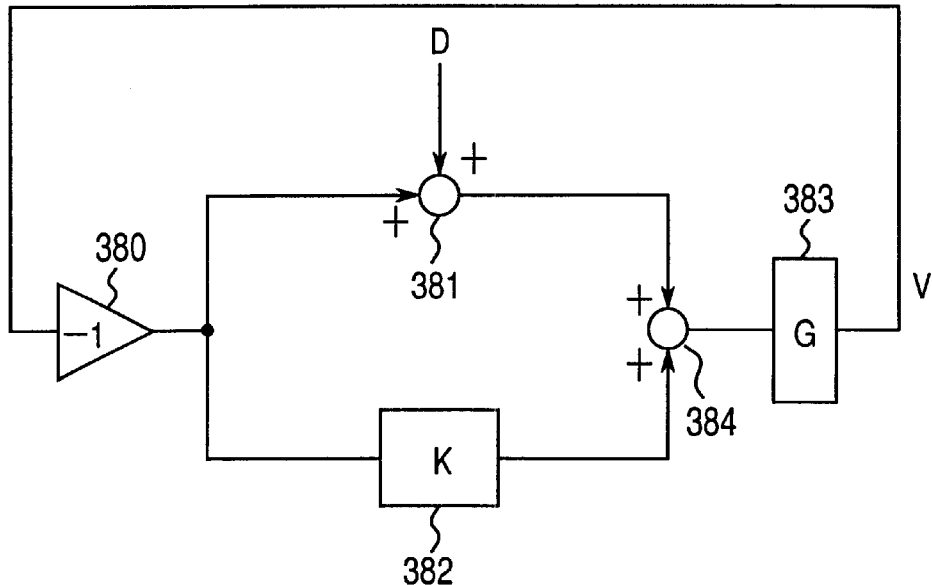
FIG. 14 is a block diagram of the entire tracking control system according to the first embodiment.

The transfer function of the output signal of block 382 with respect to D in FIG. 14 is: $-K*G/((1+K)*G+1)$. Let the DC gain of this transfer function be Gout. Also, the transfer function of the input signal of block 382 with respect to D is: $-G/((1+K)*G+1)$. Let the DC gain of this transfer function be Gin. K and G are values that are determined during design of the device and are stored beforehand in microcomputer 140.

Consequently, when the correction operation using the second TE signal settles down after closure of switch 154, the output value of block 382 becomes D*Gout. Also, the input value of block 382 becomes D*Gin. As mentioned above, simply on closing switch 154 it takes a few milliseconds before the output value of block 382 becomes D*Gout. Accordingly, microcomputer 140 obtains the level of the second TE signal immediately prior to closure of switch 154. In the case where an offset D is generated by radial tilting, the level of the second TE signal in the condition with switch 154 open is −D.

Microcomputer 140 then calculates the output level D*Gout of block 382 in the condition where the correction operation based on the second TE signal using the obtained value −D has settled. As described above, block 382 represents a circuit including O-order holder 354 and LPF 351. Also, the LPF 351 corresponds to LPF 153.

Microcomputer 140 sets the value of D*Gout at terminal b of switch 336 of LPF 153 shown in FIG. 10.

Also, microcomputer 140 connects terminal b and terminal c of switch 336. Consequently, the value of D*Gout is input to delay circuit 333.

After the value that was set onto terminal b of switch 336 has been introduced into delay circuit 333, microcomputer 140 connects the terminal a and terminal c of switch 336. The output of delay circuit 333 is output from terminal 331 through multiplier 334 and adder 332. Since the band of the tracking control system is usually about 3 kHz, the spot moves to the center of the track in a period of a few 10 µs. When the spot moves to the center of the track, the input value of LPF 153 becomes D*Gin. Since the cut-off frequency of LPF 153 is 1 Hz, the output of LPF 153 stays practically fixed at D*Gout for a period of a few tens of µs. Consequently, the settling of the correction operation based on the second TE signal is completed in a few tens of µs.

The operation is described using FIG. 39.

FIG. 39A shows the output waveform of LPF 153. Waveform B shows the level of terminal b of switch 336, waveform C shows the level of terminal d of switch 336, waveform D shows the reference clock, and waveform E shows the position of the spot, respectively.

Switch 336 is arranged such that when terminal d is in the high-level condition terminal a and terminal c are connected and when it is in the low-level condition terminal b and terminal c are connected.

At time t40 microcomputer 140 gets the level of the second TE signal, which is −D. It then calculates the value of D*Gout and sets the calculated value at terminal b of switch 336. Since microcomputer 140 sets low level at terminal d of switch 336 during the period from time t40 to t42, terminal b and terminal c of switch 336 are connected. Consequently, synchronously with the reference clock, at time t41 the calculation result of microcomputer 140 is input to delay circuit 333. The output level of delay circuit 333 at time t43 becomes D*Gout. The output of delay circuit 333 is output from terminal 331 through multiplier 334 and adder 332. Since microcomputer 140 closes switch 154 at time t41, as shown in waveform E the spot moves for a time of a few tens of µs at the center of the track. That is, the correction operation based on the second TE signal can be made to settle in a time of a few tens of µs.

Multiplier 156 will now be described.

Multiplier 156 adjusts the gain of the detection system of the second TE signal.

Microcomputer 140 sets a voltage at terminal c of adder 142 by opening switch 154. The tracking control system using the first TE signal goes off-track in response to the set voltage. The coefficient of the multiplier is set such that the output value of multiplier 156 at this point becomes equal to the set voltage at terminal c. By adjusting the coefficient of multiplier 156, it is possible to achieve a desired relationship of the gain on adding the first TE signal and second TE signal by adder 142. That is, the characteristic of FIG. 13 can be accurately realized.

Hereinafter, the output of multiplier 156 is referred to as a second TE signal after normalization.

Figure 15:
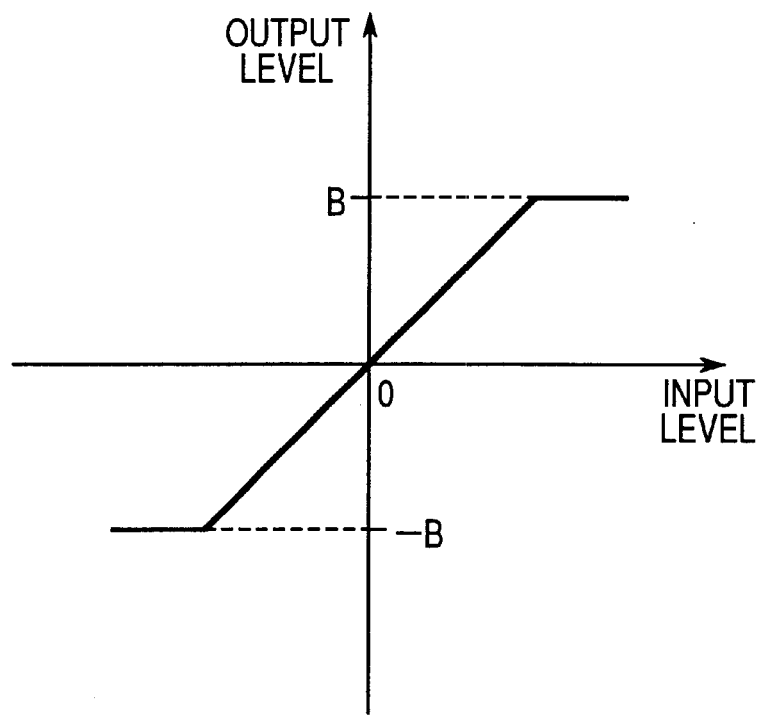
FIG. 15 is a waveform diagram given in explanation of the limiter 157 according to the first embodiment.

Limiter 157 will now be described. If its input signal is within a prescribed range, limiter 157 outputs the input signal without modification. However, if the level of the input signal exceeds the prescribed range, it limits the output value. FIG. 15 shows the relationship of input and output.

When the level of the input signal exceeds B, the output is limited to B.

When correction by the second TE signal is actuated, an offset corresponding to the radial tilt is produced in the first TE signal.

Figure 16:
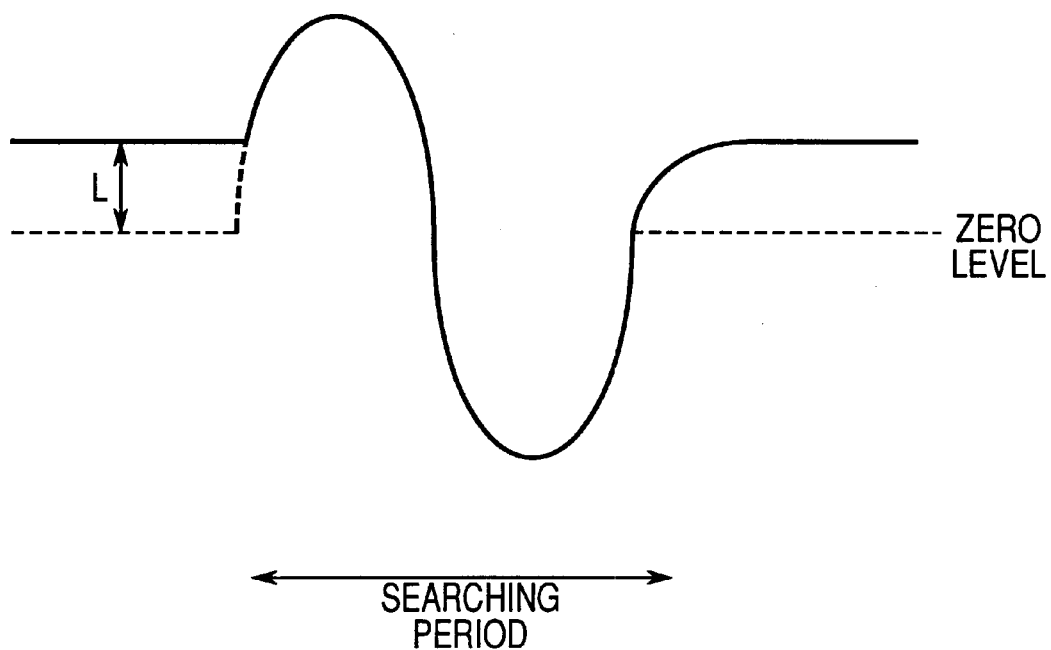
FIG. 16 is a waveform diagram illustrating the first TE signal during searching according to the first embodiment.

FIG. 16 shows the first TE signal when searching is performed crossing a single track. The dotted line is the case when the correction operation using the second TE signal is not performed. The offset occurs in the first TE signal outside the searching period. The offset is caused by the second TE signal. L is the offset produced by the radial tilt. The symmetry of the first TE signal is adversely affected by this offset so tracking control after searching becomes unstable as L becomes greater. Also, even in the condition where ordinary tracking control is actuated, the narrowness of the dynamic range on one side produces instability in respect of vibration etc.

Accordingly, stability is ensured by applying a limitation to the correction. Also, during searching, correction using the second TE signal is suspended by opening switch 154. That is, tracking control is operated after switch 154 and switch 155 are opened immediately prior to commencement of searching, and, when the target track is reached, with switch 155 again closed. Switch 154 is closed after tracking control has settled down. Pull-in of tracking is thus stabilized. In general the allowed value of the tracking error during reproduction is larger than the allowed value of the tracking error during recording. The allowed value of the tracking error during recording is smaller because of the need to avoid incomplete erasure on overwriting and erasure of adjacent tracks. Accordingly, correction using the second TE signal is performed only when recording by the closing of switch 154.

There is therefore no need for frequent opening/closing of switch 154 during searching.

If this disc is reproduced with doubled linear velocity, the frequency of the VFO regions of the header field is doubled so the characteristics of the absolute value circuit 134 and LPF 135 are changed over. The amplitude of the totally reflected light amount signal in the VFOs can thereby be accurately detected.

Second Embodiment

Figure 17:
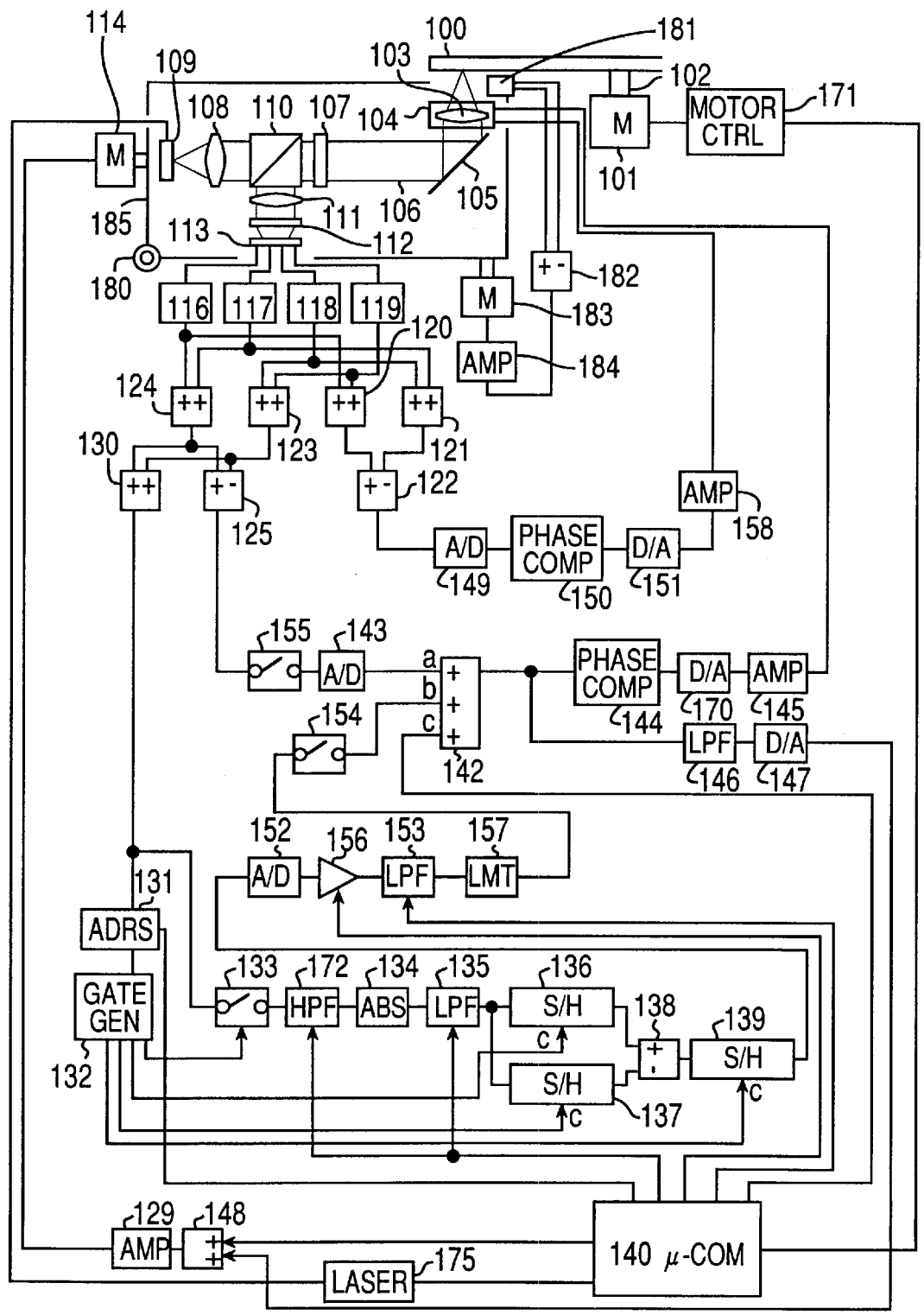
FIG. 17 is a block diagram of an optical disc apparatus according to the second embodiment of the present invention.

A second embodiment of the present invention is described below with reference to FIG. 17, which is a block diagram thereof. Blocks which are identical with blocks in the first embodiment are given the same reference numerals and further description thereof is omitted.

The point of difference from the first embodiment is that a construction is adopted whereby inclination of feed cradle 185 in the radial direction centered on axis of rotation 180 is changed, This adjustment of inclination is effected by motor 183. Motor 183 is connected to power amplifier 184. An angle sensor 181 detects inclination in the radial direction of the information surface of the disc and feed cradle 185. Since the upper surface of feed cradle 185 and the optic axis are designed to be at right angles, inclination of the information surface of the disc and the optic axis can be detected. Specifically, radial tilt can be detected. The output of angle sensor 181 is sent to power amplifier 184 through subtractor 182. The construction is such that the output of subtractor 184 becomes zero when the angle of the disc information surface and the optic axis is 90°. The angle of feed cradle 185 is therefore controlled such that the angle of the disc information surface and the optic axis becomes 90°.

Although in the first embodiment a construction was described in which the target position of the tracking control system was altered so as to make the amplitudes of the totally reflected light amount signals in VFO1 and VFO2 equal, strictly, if there is radial tilting, tracking error is produced even if the amplitudes in VFO1 and VFO2 are equal. In the case of a radial tilt of 0.4°, tracking error of about 0.018 µm is produced.

Accordingly, in the second embodiment, the effect of radial tilting is eliminated by adding an inclination adjustment function. The spot is thereby able to follow the center of the track more accurately.

Figure 18:
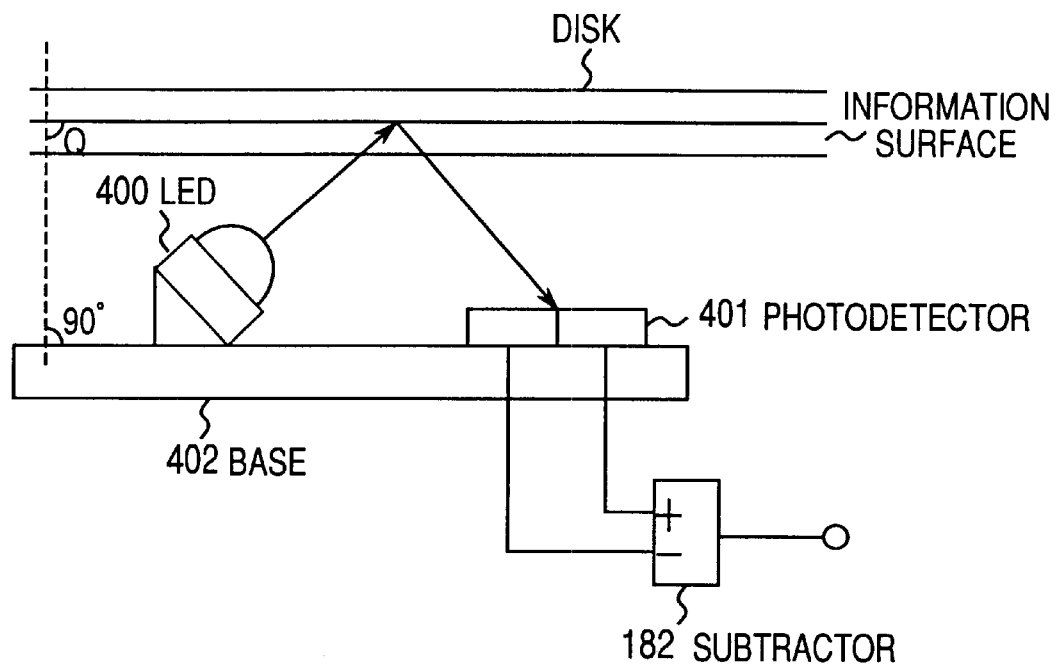
FIG. 18 is a block diagram of an angle sensor according to the second embodiment of the present invention.

The construction of angle sensor 181 will now be described with reference to FIG. 18.

An LED 400 and dual-section photodetector are mounted on base 402.

Figure 19:
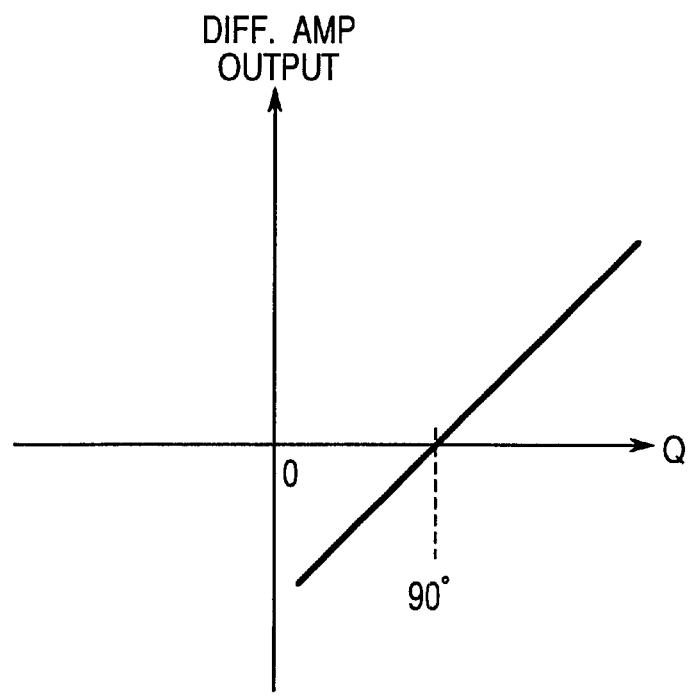
FIG. 19 is a characteristic diagram showing the characteristic of an angle sensor according to the second embodiment of the present invention.

The beam that is directed thereonto from LED 400 is reflected at the information surface of the disc and input to photodetector 401. Photodetector 401 is mounted such that when angle Q is 90° the amounts of light arriving at the respective photodetection sections of the photodetector are equal. If angle Q departs from 90° the amounts of light arriving at the respective photodetection sections of the photodetector become unequal. FIG. 19 shows the output of subtractor 182 with respect to angle Q. At 90° this is zero, at more than 90° it is positive and at less than 90° it is negative.

By the addition of an inclination adjustment function in the second embodiment, the radial tilt can be controlled to practically zero. If the amplitudes of the totally reflected light amount signals in VFO1 and VFO2 are equal, the spot is therefore accurately positioned at the center of the track.

Third Embodiment

A third embodiment of the present invention is described below with reference to FIG. 20, which is a block diagram thereof. Blocks which are identical with blocks in the second embodiment are given the same reference numerals and further description thereof is omitted.

The point of difference from the second embodiment is that angle sensor 181 and subtractor 182 are eliminated and HPFs 420, 421, 428, binary conversion circuits 422, 423, and 429, phase comparator 424, LPF 425, switch 426 and PLL circuit 430 are added. Also, microcomputer 140 is replaced by microcomputer 427 and disc 100 is replaced by disc 428, respectively.

HPFs 420, 421 and 428 are HPFs that remove the DC components of the input signal. Binary conversion circuits 422, 423, and 429 are circuits that convert input signals to two values: high level and low level with reference to a zero level before output. Phase comparator 424 compares the phase of input signals and outputs voltage E during the period where the phase of terminal a leads the phase of terminal b and outputs a negative voltage –E during the period where the phase of terminal a lags the phase of terminal b.

Figure 20:
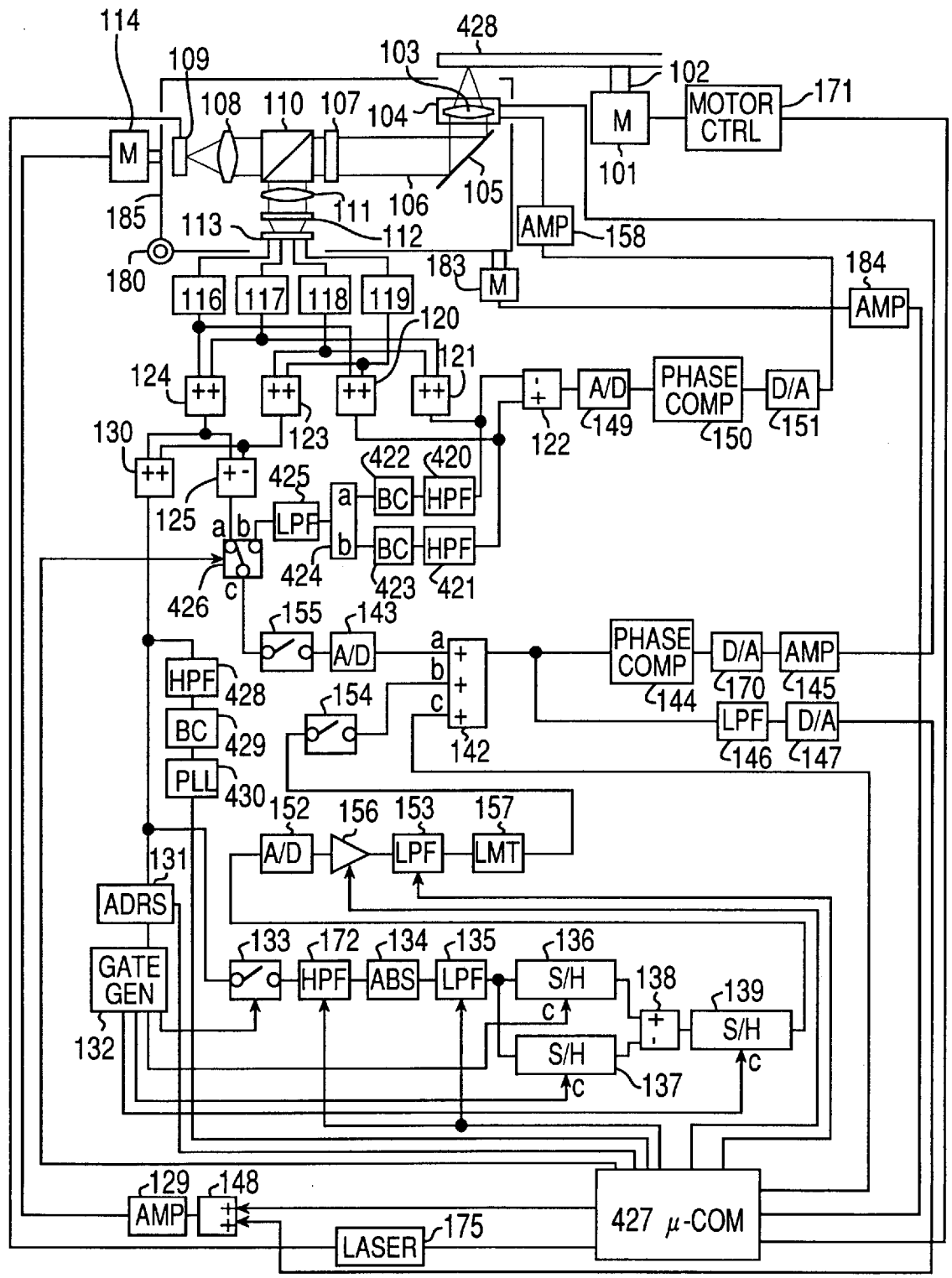
FIG. 20 is a block diagram of an optical disc apparatus according to the third embodiment of the present invention.

The optical system illustrated in FIG. 20 and HPFs 420, 421, binary conversion circuits 422, 423, phase comparator 424, and LPF 425 illustrate a TE signal detection system generally called the differential phase detection method. The differential phase detection method is a system wherein the TE signal is detected on a track that is formed by a pit sequence consisting of lands and grooves. Hereinbelow a pit sequence consisting of lands and grooves will be referred to as an embossed region.

In the differential phase detection method, the tracking error that is produced by radial tilting generated as described above in the push-pull detection method does not occur.

Disc 428 is provided with embossed regions at its inner circumference and outer circumference.

Binary conversion circuit 429 converts to a binary value the totally reflected light amount signal that is output by adder 130 through HPF 428.

PLL circuit 430 has a phase locked loop for generating a clock that is synchronized with the output of binary conversion circuit 429. PLL circuit 430 comprises a phase comparator, an LPF, VCO and frequency divider. Also, the jitter of the, pit sequence is indicated by the signal obtained by passing the output of the phase comparator through the LPF. Hereinbelow this will be termed the jitter detection signal.

Microcomputer 427 moves the light beam spot into the inner circumferential embossed region by driving feed motor 114. By connecting terminal b and terminal c of switch 426, microcomputer 427 sends to A/D converter 143 through switch 155 a TE signal representing the phase difference. In a condition with switch 154 open, microcomputer 427 then actuates tracking control by closing switch 155. PLL circuit 430 sends a jitter detection signal to microcomputer 427. Microcomputer 427 drives motor 183 through power amplifier 184 so that the jitter detection signal becomes a minimum. Drive of motor 183 is stopped at the time-point where the jitter detection signal has become a minimum.

The angle at which the jitter detection signal becomes a minimum is the angle at which the radial tilt becomes zero.

Microcomputer 4127 stops tracking control by opening switch 155. After this, it drives feed motor 114 through power amplifier 129 such that the spot moves into the rewritable region where the tracks are formed by lands and grooves.

After the movement, tracking control is actuated by connecting terminal a and terminal c of switch 426 and closing switch 155.

The operation of microcomputer 427 when tracking control is actuated will now be described.

Microcomputer 427 actuates tracking control by closing switch 155. Address reproduction circuit 131 reads the address and sends the address to a microcomputer 427. Microcomputer 427 sets a speed of rotation corresponding to the zone. Address reproduction circuit 131 sends an address synchronization signal to gate generating circuit 132.

Gate generating circuit 132 generates a prescribed gate signal causing the second TE signal to be output from S/H circuit 139.

Microcomputer 427 corrects the target position of the tracking control system that is operated using the first TE signal in accordance with the second TE signal by closing switch 154.

Just as in the case of the second embodiment, in the third embodiment, the effect of radial tilting is eliminated by adding an inclination adjustment function. In the third embodiment, detection of radial tilting is performed by detection using the jitter detection signal in the embossed region.

If therefore the amplitudes of the totally reflected light amount signals in VFO1 and VFO2 are made equal, the spot is accurately positioned at the center of the track.

Figure 21:
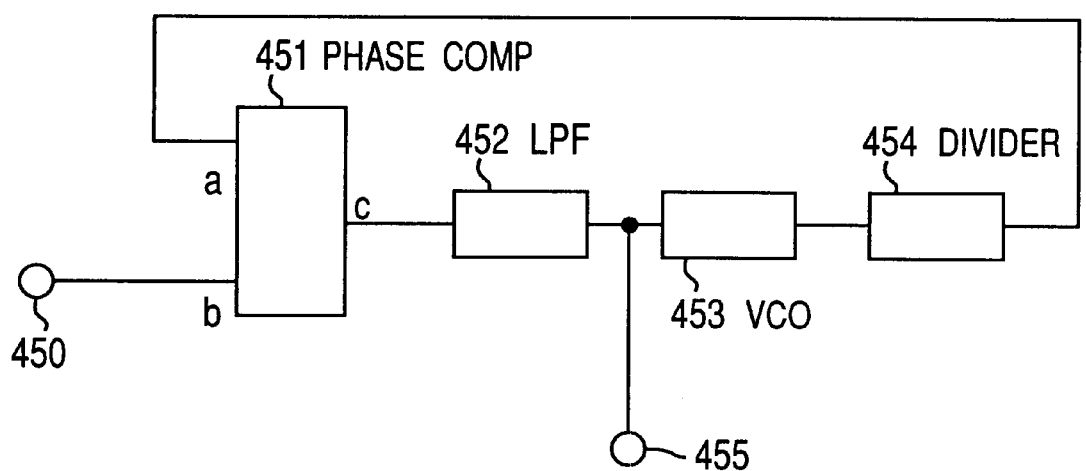
FIG. 21 is a block diagram of a PLL circuit 430 according to the third embodiment of the present invention.

The PLL circuit 430 will now be described in detail. A block diagram thereof is shown in FIG. 21.

Terminal 450 is connected to binary conversion circuit 429. Terminal 455 is connected to microcomputer 427. Phase comparator 451 compares the phase of input signals and outputs voltage E during the period where the phase of terminal a leads the phase of terminal b and outputs a negative voltage –E during the period where the phase of terminal a lags the phase of terminal b. LPF 452 removes the high-band frequency component of the output of phase comparator 451 and sends the result to voltage controlled oscillator 453 (hereinbelow referred to as VCO 453). VCO 453 generates a clock of frequency corresponding to the input voltage. Frequency divider 454 divides the frequency of the input clock and sends it to terminal a of phase comparator 451.

Figure 22:
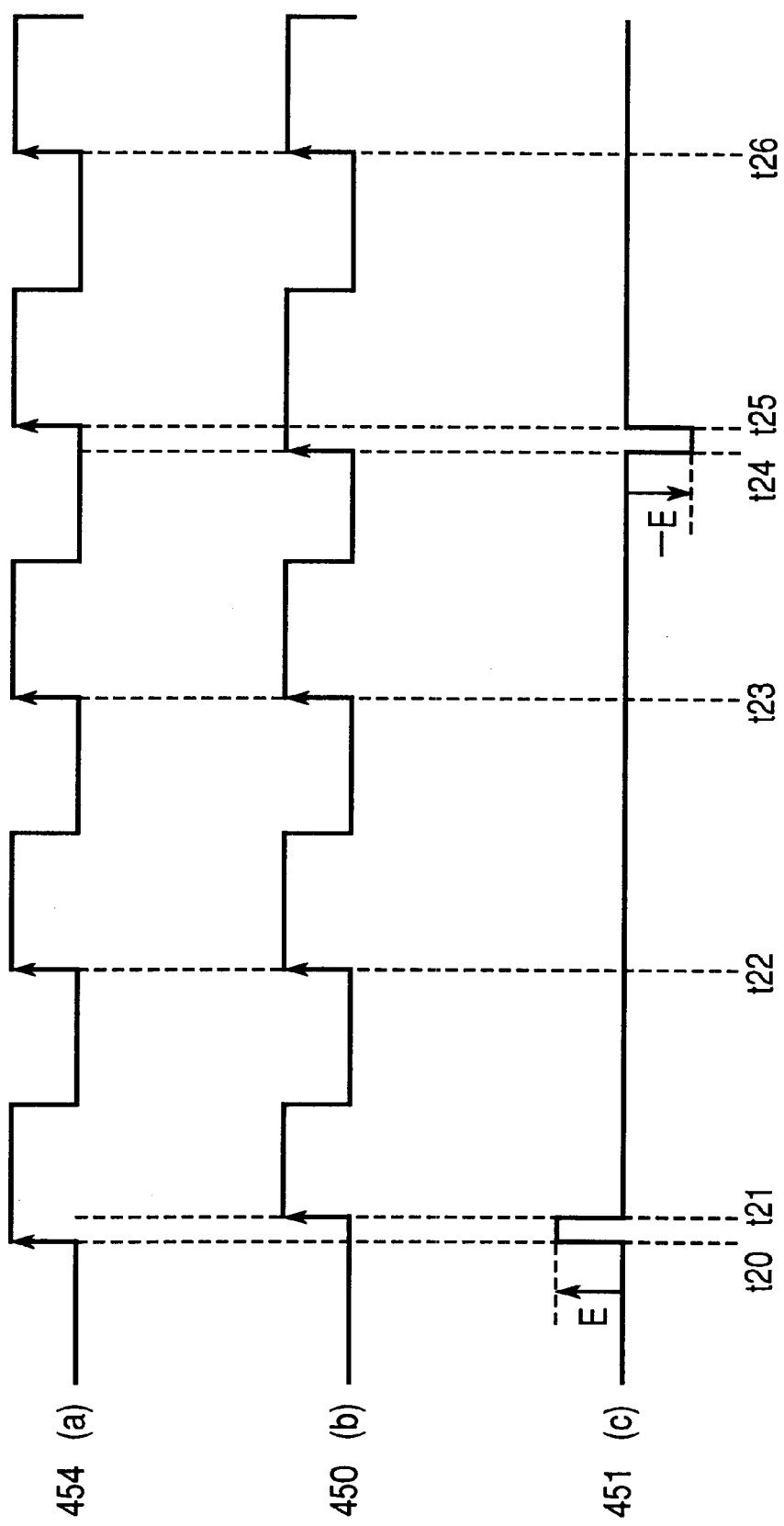
FIG. 22 is a waveform diagram given in explanation of a PLL circuit 430 according to the third embodiment of the present invention.

The operation will now be described with reference to FIG. 22.

Waveform a indicates the output of frequency divider 454, waveform b indicates the waveform of terminal 450, and waveform c indicates the output of phase comparator 451.

At time t2O the waveform a becomes high-level, and at time t21 the waveform b becomes high-level. Since the phase of the signal at terminal a of is phase comparator 451 leads the phase of the signal of terminal b, during the period from time t20 to t21 the output of phase comparator 451 is E. The output of phase comparator 451 is zero since the timings of becoming high-level are concurrent at time t22 and t23. At time t24 the waveform b becomes high-level and at time t25 the waveform a becomes high-level. Since the phase of the signal at terminal b of phase comparator 451 leads the phase of the signal of terminal a, during the period from time t24 to t25 the output of phase comparator 451 is –E.

LPF 452 removes the high-band frequency component of the output of phase comparator 451 and sends the result to VCO 453. The output of VCO is therefore controlled such that its phase coincides with the signal that is input to terminal b of phase comparator 451. The output of LPF 452 indicates the jitter of the signal that is reproduced from the disc and the signal that is generated by VCO 453.

Figure 23:
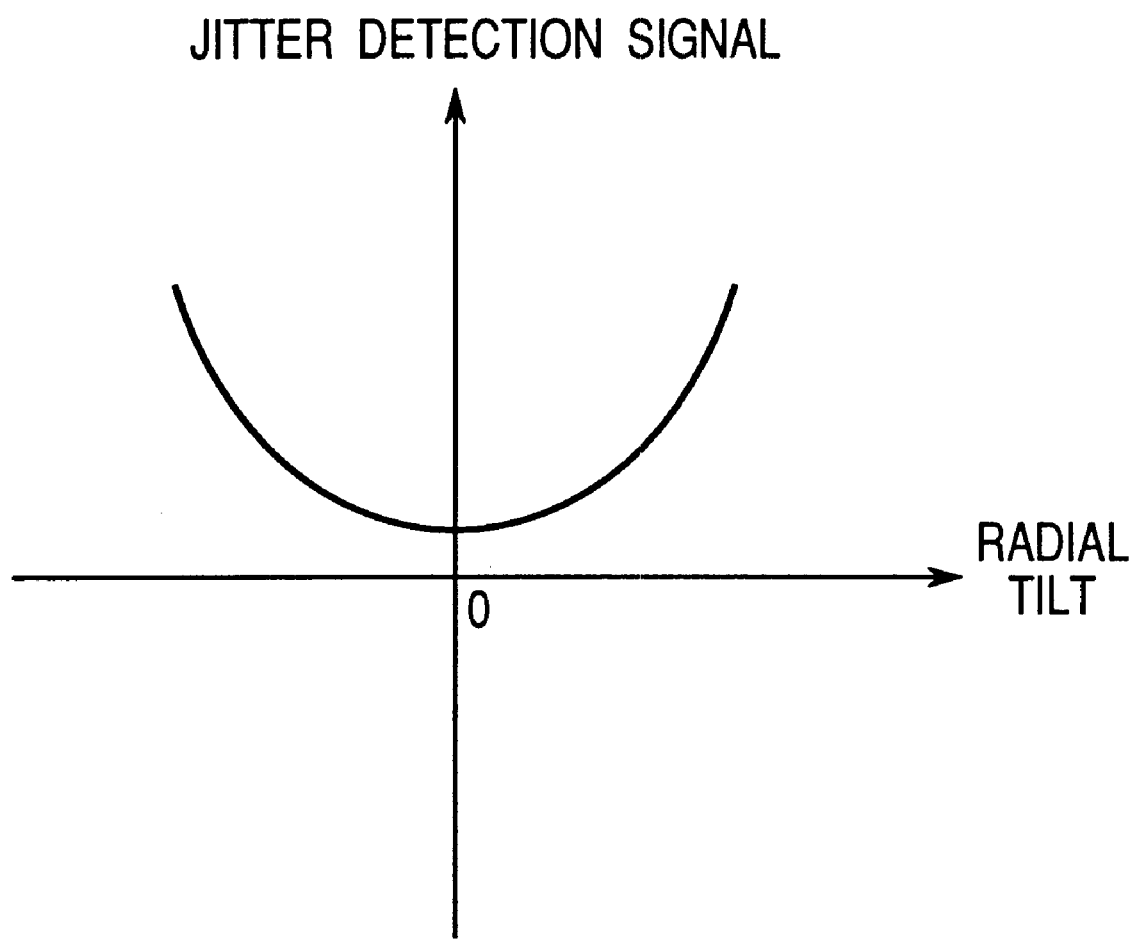
FIG. 23 is a characteristic diagram showing the relationship of a jitter detection signal and radial tilt according to the third embodiment of the present invention.

This jitter detection signal shows a characteristic as in FIG. 23 with regard to the radial tilt. It is a minimum when the radial tilt is zero.

That is, the radial tilt can be made zero by minimizing the jitter detection signal.

In the third embodiment, adjustment of the radial tilt was performed in the inner circumferential embossed region but it would be possible to alter the adjustment value in accordance with radial position by performing this at the inner circumference and outer circumference respectively. An adjustment value modified in accordance with radial position can be found by linear interpolation etc.

If this is done, the accuracy of adjustment is raised compared with the case where adjustment is effected only at the inner circumference.

Embodiment 4

A fourth embodiment of the present invention will be described with reference to FIG. 24, which is a block diagram thereof. Blocks which are the same as those of the third embodiment described above are given the same reference numerals and further description thereof is omitted.

The. point of difference from the third embodiment is that adder 504, switch 502, LPF 503 and D/A converter 501 are added. Also, microcomputer 427 is substituted by microcomputer 505.

In the embodimnent of FIG. 4, detection of the radial tilt for angle adjustment is performed using the. level of the first TE signal when the target positional of tracking control has been corrected by the second TE signal.

Also, the offset correct ion of the detection signal of the radial tilt is performed using an embossed region at the inner circumference.

A method of detection of the radial tilt for angle adjustment will now be described.

Figures 25A, 25B, 25C:
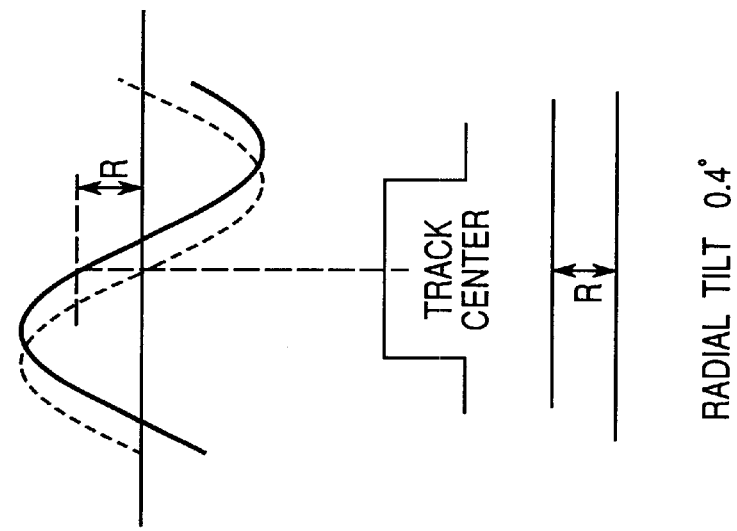
FIGS. 25A, 25B and 25C are a view given in explanation of a method of radial tilt detection according to the fourth embodiment of the present invention.

FIG. 25A shows the relationship of the track and the first TE signal when the radial tilt is −0.4°. The dotted line shows the case where there is no tilt. When the tilt is −0.4°, the level of the first TE signal becomes zero when tracking control is actuated. In this condition, the level of the TE signal when correction is actuated by the second TE signal is −R. This is because the spot is controlled to the center of the track by the correction by the second TE signal.

FIG. 25B shows the relationship between the first TE signal and the track when there is no radial tilt. When the tilt is 0°, the level of the first TE signal becomes zero when tracking control is actuated. If in this condition the correction by the second TE signal is actuated, the level of the TE signal stays at zero without changing.

FIG. 25C shows the relationship between the first TE signal and the track when the radial tilt is 0.4°. The dotted line shows the case when there is no radial tilt. When the tilt is 0.4°, the level of the first TE signal becomes zero when tracking control is actuated. If in this condition the correction by the second TE signal is actuated, the level of the TE signal becomes R.

That is, the level of the first TE signal when correction by the second TE signal is actuated corresponds to the radial tilt.

Accordingly, microcomputer 505 closes switch 502 and drives motor 183 in accordance with the first TE signal.

Accordingly, the radial tilt is controlled to become zero. As the tilt approaches zero, the tracking error of the first TE signal resulting from the radial tilt approaches zero. LPF 503 controls the bandwidth of the angle control system to be no more than a few Hz.

Adder 506 will now be described. Adder 506 performs offset correction of the radial tilt detection signal.

Microcomputer 505 moves the light beam into the inner circumferential embossed region by driving feed motor 114. By connecting terminal b and terminal c of switch 426, microcomputer 505 sends a TE signal obtained by the differential phase method to A/D converter 143 through switch 155. With switch 154 in an open condition, microcomputer 505 actuates tracking control by closing switch 155. PLL circuit 430 sends a jitter detection signal to microcomputer 505. Microcomputer 505 drives motor 182 by means of adder 504 and power amplifier 184 such that the jitter detection signal becomes a minimum. Output to power amplifier 183 is stopped at the time-point where the jitter detection signal is initialized.

Microcomputer 505 stops tracking control by opening switch 155. After this, it shifts the spot into the rewritable region whose tracks are formed by lands and grooves in the vicinity of the embossed region, by driving feed motor 114 by means of power amplifier 129.

After thus shifting the spot, it actuates tracking control by closing switch 155. Also, it actuates correction by the second TE signal by closing switch 154. Microcomputer 505 gets the first TE signal and sets this value at one terminal of subtractor 506. The output of subtractor 506 therefore becomes zero. After this, microcomputer 505 commences angle control by closing switch 502.

Since in the rewritable region whose tracks are formed by lands and grooves in the embossed region and in the vicinity of the embossed region the radial tilt is practically the same, the radial tilt is also zero in the rewritable region whose tracks pre formed by lands and grooves in the vicinity of the embossed region. The tilt detection offset is therefore corrected using the first TE signal.

Since the track is formed in spiral fashion, the spot is gradually displaced towards the outer circumference. If the tilt of the disc etc. changes, the level of the first TE signal changes in accordance with the radial tilt. Motor 183 is driven in response to the first TE signal so the radial tilt is always controlled to be zero.

Figure 26A:
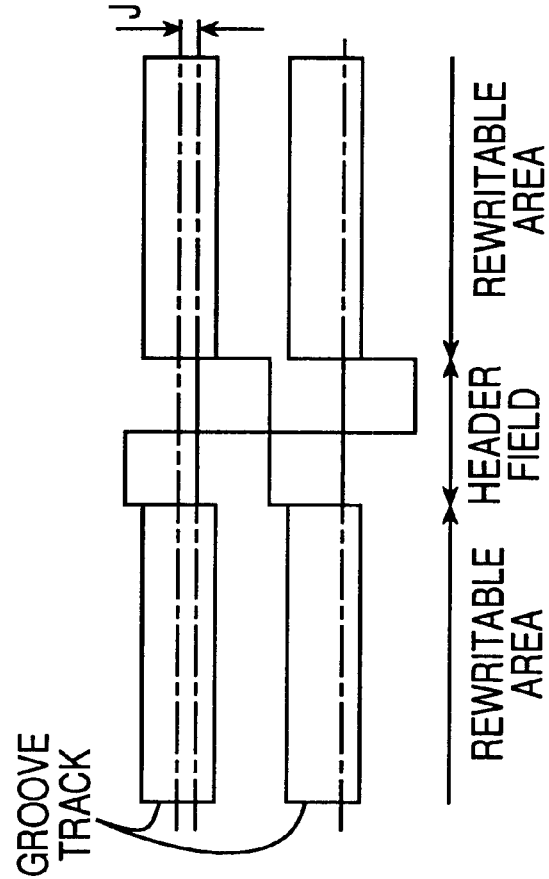
FIGS. 26A and 26B are a diagram given in explanation of the offset of a radial tilt detection signal according to the fourth embodiment of the present invention.
Figure 26B:
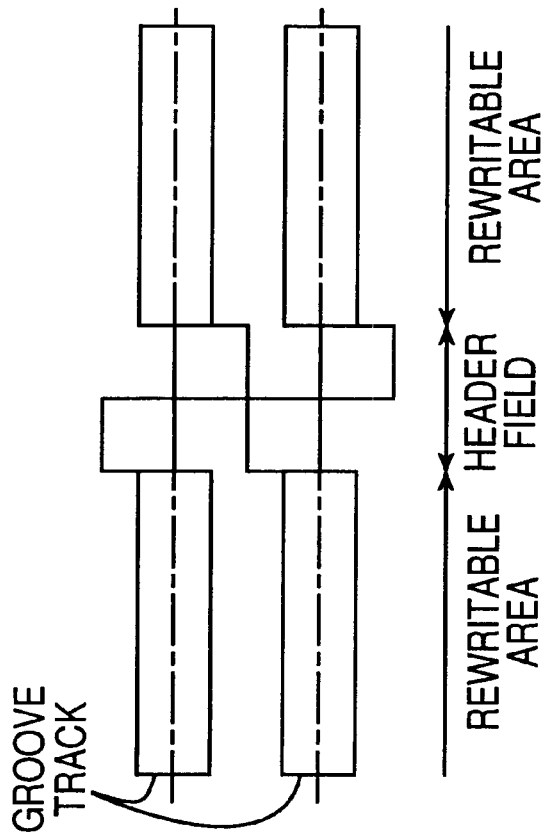

One of the causes of offset of the tilt detection signal obtained using the first TE signal will now be described using FIG. 26. For simplicity in description, s the header field is indicated by a continuous groove. FIG. 26A shows the case where the center of the header field and the center of the groove of the rewritable region coincide. This is the normal case. FIG. 26B shows the case where the center of the header field, indicated by the dotted lines, and the center of the rewritable region, indicated by the solid lines, are offset. This is a case where offset occurs when lands/grooves and header fields are formed. In the case of FIG. 26B, when correction of the target position of the tracking control system is performed such that the amplitudes of VFO1 and VFO2 are equal, the value of this correction is a DC component of a level corresponding to J. A DC component is also generated in the correction value by inclination etc. of the lands/grooves. As described above, offset of the first TE signal produced by offset of the center of the lands of the rewritable region and the center of the header field can be corrected by measuring the offset of the first TE signal in the rewritable region whose tracks are formed by lands and grooves in the vicinity after adjusting the radial tilt in the embossed region and setting the result of this measurement at one terminal of subtractor 506.

In the case of searching for another track, the operation of motor 183 can be stopped by opening switch 502. The inclination of feed cradle 185 is held. After this, tracking control is stopped by opening switches 154 and 155 and the spot is shifted to the target track by driving feed motor 114. After shifting to the target track, tracking control is actuated by closing switches 154, 155. Angle control is again actuated by closing switch 502.

Feed-forward operation will now be described using the operation after searching.

Microcomputer 505 actuates tracking control using the first TE signal by closing switch 155 in a condition with switch 154 open.

Address generating circuit 131 reads the address and sends it to microcomputer 505. Microcomputer 505 then sets a speed of rotation corresponding to the zone. Gate generating circuit 132 generates a prescribed gate signal which causes the second TE signal to be output from S/H circuit 139.

If there is a DC component radial tilt at this track, the first TE signal has an offset corresponding to the radial tilt.

Since the band of angle control is restricted to a few Hz, it takes a few tens of ms before settling down, even though switch 502 is closed.

Figure 27:
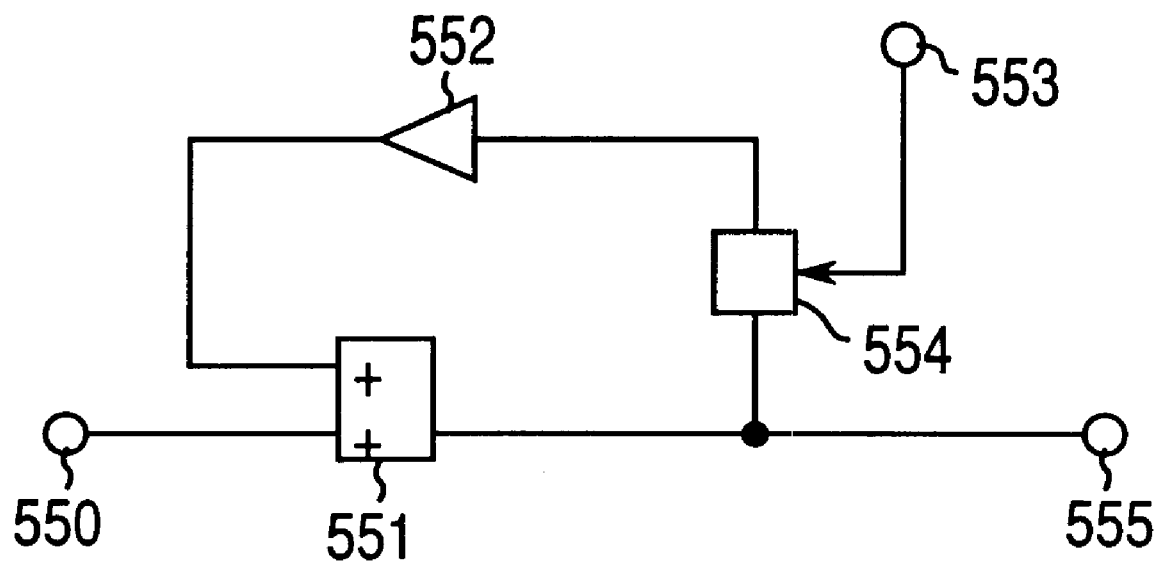
FIG. 27 is a block diagram of LPF 503 according to the fourth embodiment of the present invention.

Microcomputer 505 therefore sets the initial value of LPF 503 in is accordance with the first TE signal immediately prior to closure of switch 502. A block diagram of LPF 503 is shown in FIG. 27. Like LPF 153, LPF 503 is a digital filter.

Terminal 550 is connected to switch 502. Also, terminal 555 is connected to D/A converter 501. Terminal 553 is connected to microcomputer 505. Multiplier 552 outputs the input signal after multiplying it by a coefficient. Delay circuit 554 outputs the input signal after delaying it by a time of period T. The respective circuits perform processing in terms of digital values synchronized with a reference clock of period T.

Let the immediately previous first TE signal be F. Microcomputer 505 sets F in the delay circuit 554 of LPF 503 of FIG. 27. Usually, a response that takes a few tens of ms is speeded up to a few ms.

Next, multiplier 500 will be described.

Multiplier 500 adjusts the gain of the radial tilt detection system in accordance with the first TE signal. Microcomputer 505 sets a voltage in adder 504 by opening switch 502. Feed cradle 185 is tilted by a prescribed number of degrees of angle by driving motor 183 at a prescribed rotational speed.

The first TE signal has a level corresponding to the applied angle. Microcomputer 505 sets the coefficient of multiplier 500 such that the amount of change of output of multiplier 500 at this point is a prescribed value. The gain of the angle control system can be set to a prescribed value by adjusting the coefficient of multiplier 500.

As described above, since, if the target position of the tracking control system is not corrected by the second TE signal, that is if switch 154 is not closed, the level of the first TE signal will not be a signal corresponding to the radial tilt, angle control will have to be put into a hold condition or disabled.

Although in the fourth embodiment the offset of the first TE signal was adjusted in the embossed region at the inner circumference and in the rewritable region whose tracks are formed by lands and grooves in the vicinity thereof, it would be possible to perform this at the inner circumference and outer circumference respectively and to alter the adjustment value in accordance with radial position. An adjustment value modified in accordance with radial position can be found by linear interpolation etc.

If this is done, the accuracy of adjustment is raised compared with the case where adjustment is effected only at the inner circumference.

Fifth Embodiment

Figure 28:
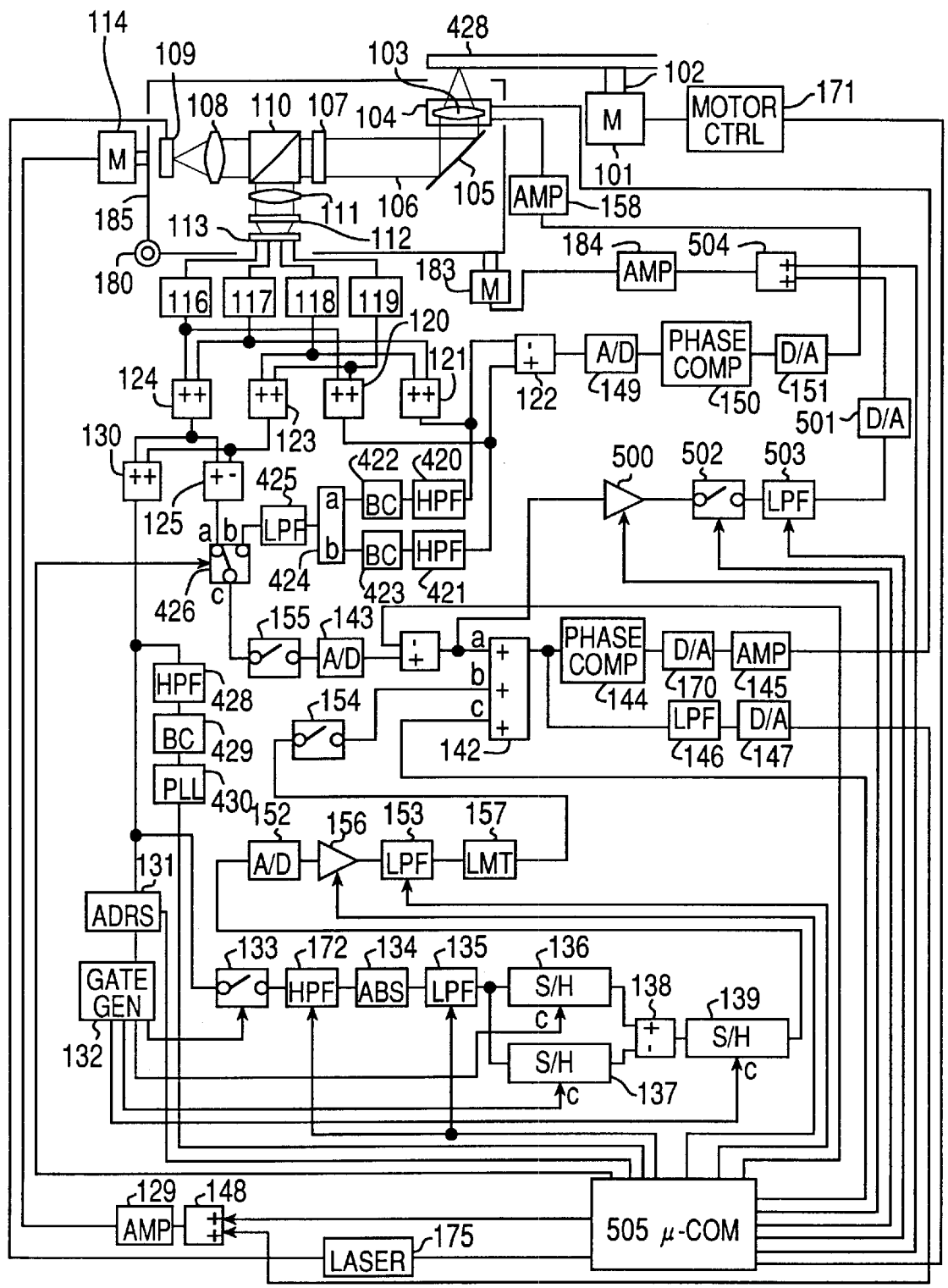
FIG. 28 is a block diagram of an optical disc apparatus according to the fifth embodiment of the present invention.

A fifth embodiment of the present invention will be described with reference to FIG. 28, which is a bloc diagram thereof. Blocks which are the same as those of the fourth embodiment described above are given the same reference numerals and further description thereof is omitted.

The point of difference from the fourth embodiment is that subtractor 506 is eliminated and subtractor 560 is added.

The point of difference of the fifth embodiment from the fourth embodiment lies in the method of offset correction of the radial tilt detection signal. Specifically, the method of correction of the offset of the first TE signal is different. This will be described with reference to subtractor 560. Subtractor 560 performs the offset correction of the radial tilt detection signal.

Microcomputer 505 shifts the spot into the embossed region at the inner circumference by driving feed motor 114.

By connecting terminal b and terminal c of switch 426, microcomputer 505 sends to A/D converter 143 through switch 155 a TE signal obtained by the differential phase method. In a condition with switch 154 open, microcomputer 505 then actuates tracking control by closing switch 155. PLL circuit 430 sends a jitter detection signal to microcomputer 505. Microcomputer 505 drives motor 183 through power amplifier 184 so that the jitter detection signal becomes a minimum. Output to power amplifier 184 is stopped at the time-point where the jitter detection signal has become a minimum.

Microcomputer 505 stops tracking control by opening switch 155. After this, it drives feed motor 114 through power amplifier 129 such that the spot moves into the rewritable region in the vicinity of the embossed region, where the tracks are formed by lands and grooves.

After this movement, tracking control is actuated by closing switch 155. Thereafter, by closing switch 154, correction is performed using the second TE signal. Microcomputer 505 gets the first TE signal and sets this value at one terminal of subtractor 560. The output of subtractor 560 therefore becomes zero. Microcomputer 505 then commences angle control by closing switch 502.

Since the track is formed in spiral fashion, the spot is gradually displaced towards the outer circumference. If the radial tilt of the disc etc. changes, the level of the first TE signal changes in accordance with the tilt. Motor 183 is driven in response to the output of subtractor 560 so the tilt is always controlled to be zero.

In the fifth embodiment, offset correction of the radial tilt detection signal is performed by changing the target position of tracking control in accordance with the first TE signal. Also, the value that is set at one terminal of subtractor 560 corresponds to the amount of offset of the pit sequence of header field and grooves of rewritable region. The accuracy of correction of the target position by the second TE signal can therefore be raised since feed-forward control is achieved.

As described with reference to the fourth embodiment, it is possible to measure the set value of one terminal of subtractor 560 at the inner circumference and outer circumference respectively and to alter the set value in accordance with radial position.

Sixth Embodiment

Figure 29:
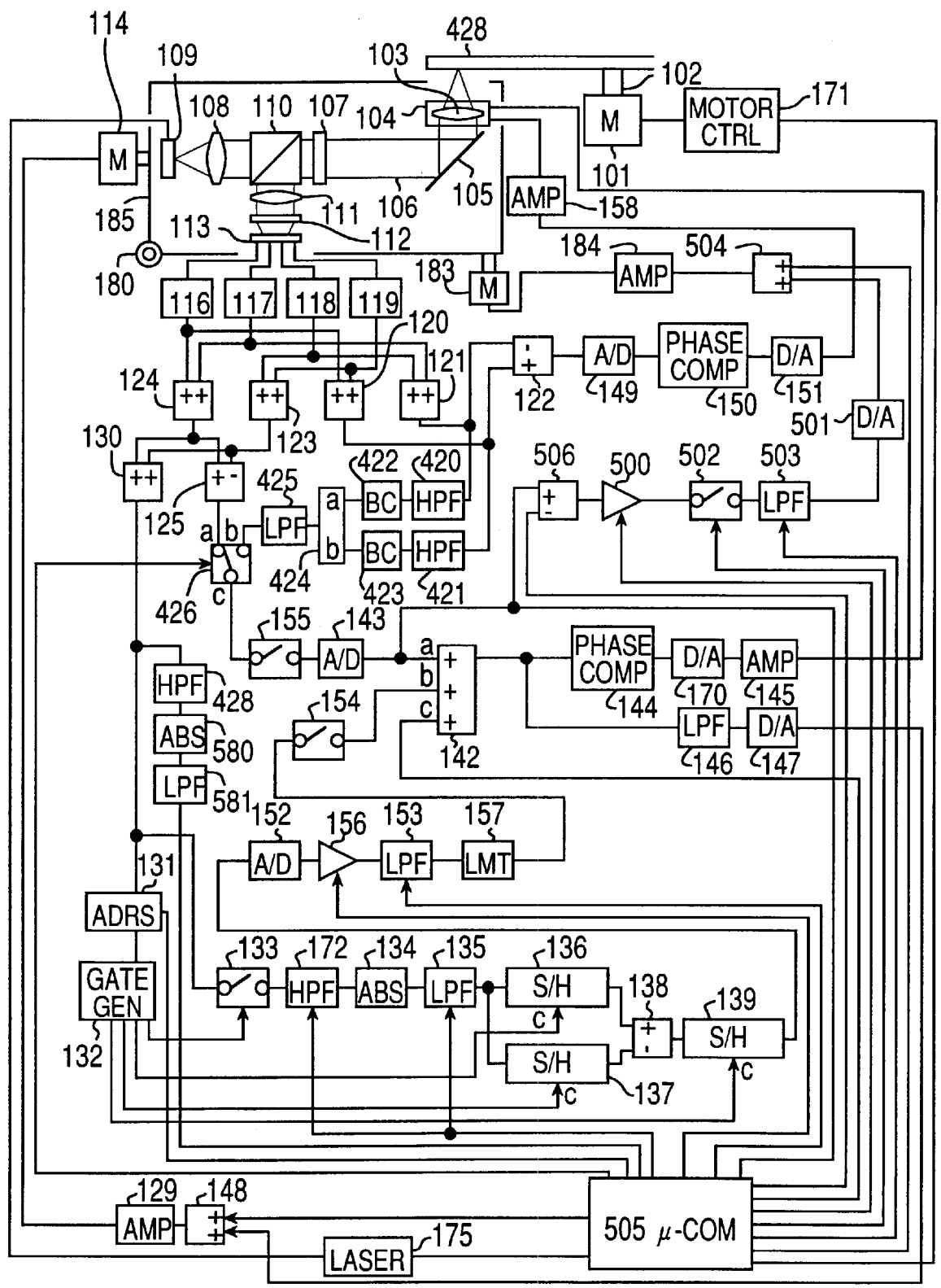
FIG. 29 is a block diagram of an optical disc apparatus according to the sixth embodiment of the present invention.

A sixth embodiment of the present invention will be described with reference to FIG. 29, which is a block diagram thereof. Blocks which are the same as those of the fourth embodiment described above are given the same reference numerals and further description thereof is omitted.

The point of difference from the fourth embodiment is that binary conversion circuit 429 and PLL circuit 430 are eliminated and absolute value detection circuit 580 and LPF 581 are added.

The point of difference of the sixth embodiment from the fourth embodiment lies in the method whereby offset correction of the radial tilt detection signal is performed in the embossed region at the inner circumference.

Absolute value circuit 580 is identical with absolute value circuit 134. Also, LPF 581 removes high-band frequency components of the input signal. Microcomputer 505 moves the spot into the inner circumferential embossed region by driving feed motor 114. By connecting terminal b and terminal c of switch 426, microcomputer 505 sends to A/D converter 143 through switch 155 a TE signal obtained by the differential phase method. In a condition with switch 154 open, microcomputer 505 then actuates tracking control by closing switch 155. A signal corresponding to the information recorded in the embossed region is then input to absolute value circuit 580 through HPF 428. Absolute value circuit 580 outputs the absolute value of the input signal, based on a zero level. LPF 581 removes high-frequency components of the input signal. The output of LPF 581 therefore indicates the amplitude of the totally reflected light amount signal in the embossed region. Microcomputer 505 drives motor 183 through adder 504 and power amplifier 184 such that the amplitude of the totally reflected light amount signal is a maximum. Output to power amplifier 184 is stopped at the time-point where the amplitude of the totally reflected light amount signal has become a maximum.

Subsequent operation is the same as in the case of the fourth embodiment.

Figure 30:
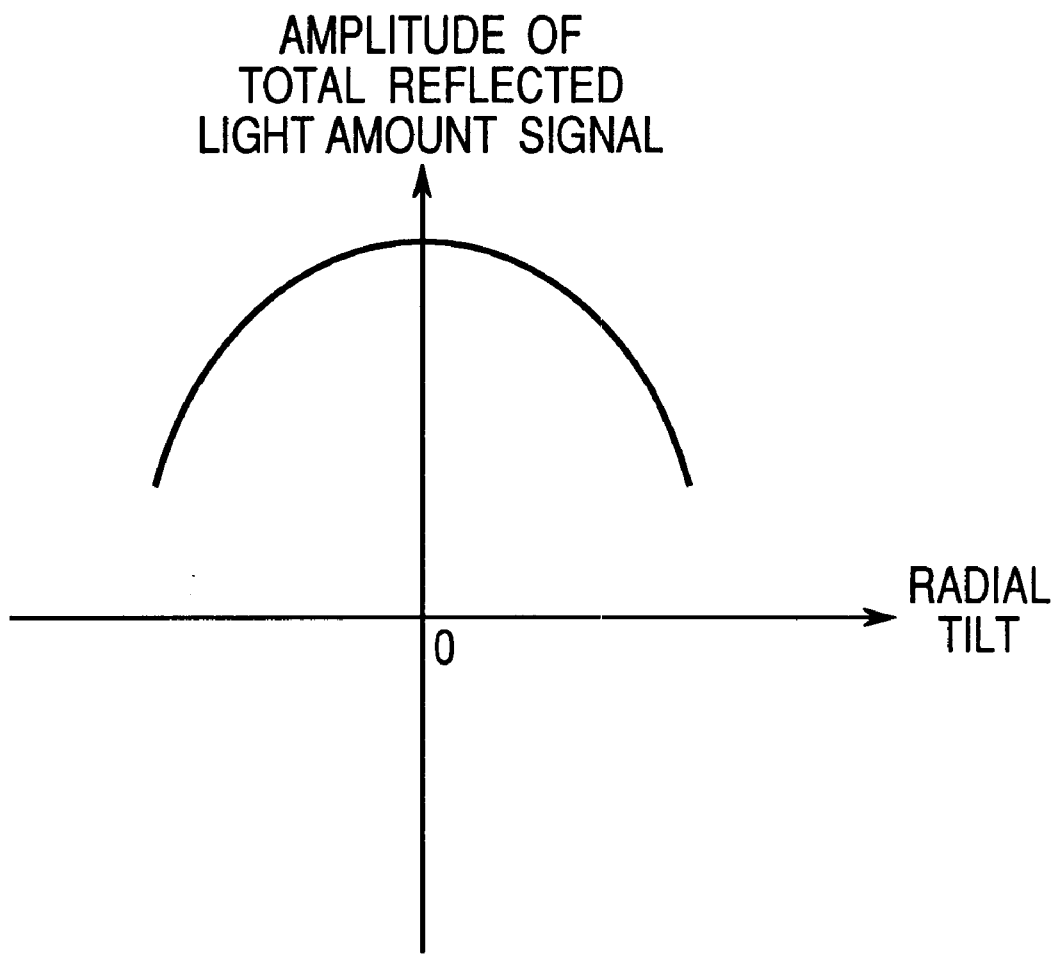
FIG. 30 is a characteristic diagram illustrating the relationship of the totally reflected light amount signal amplitude and the radial tilt according to the sixth embodiment of the present invention.

FIG. 30 shows the relationship between the amplitude of the totally reflected light amount signal of the embossed region and the radial tilt.

When the radial tilt is zero, the amplitude of the totally reflected light amount signal is a maximum.

Seventh Embodiment

Figure 31:
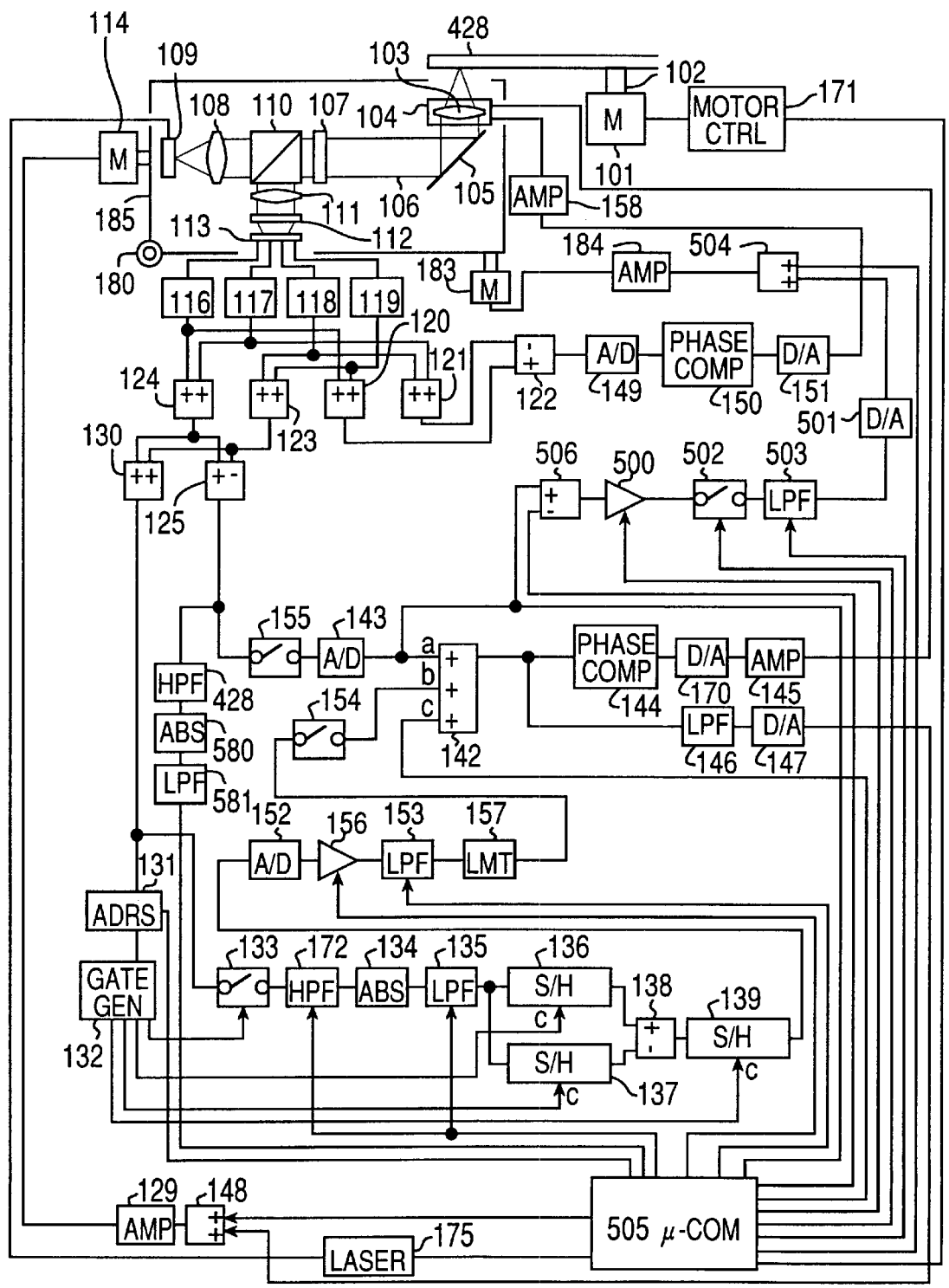
FIG. 31 is a block diagram of an optical disc apparatus according to the seventh embodiment of the present invention.

Hereinbelow a seventh embodiment of the present invention will be described with reference to FIG. 31, which is a block diagram thereof. Blocks which are the same as those of the sixth embodiment described above are given the same reference numerals and further description thereof is omitted.

The points of difference from the sixth embodiment are that the block of the TE signal detection system based on the differential phase method is eliminated and that the input terminal of the binary conversion circuit 428 is connected to subtractor 125. Also, microcomputer 505 is substituted by microcomputer 590.

The point of difference of the seventh embodiment and the fourth embodiment is the method of offset correction of the radial tilt detection signal.

Microcomputer 590 shifts the spot into the rewritable region wherein tracks are formed by lands and grooves, by driving feed motor 114. Microcomputer 590 disables tracking control by opening switches 155 and 154. The first TE signal is input to absolute value circuit 580 through HPF 428.

Absolute value circuit 580 outputs the absolute value of the input signal with reference to zero level. LPF 581 removes high-frequency components of the input signal. The output of LPF 581 therefore indicates the amplitude of the first TE signal in the condition where tracking control is disabled. Microcomputer 590 drives motor 183 through adder 504 and power amplifier 184 such that the amplitude of the first TE signal in the condition where tracking control is disabled is a maximum. Output to power amplifier 184 is stopped at the time-point where the amplitude of the first TE signal has become a maximum.

Subsequent operation is the same as in the case of the sixth embodiment.

Figure 32:
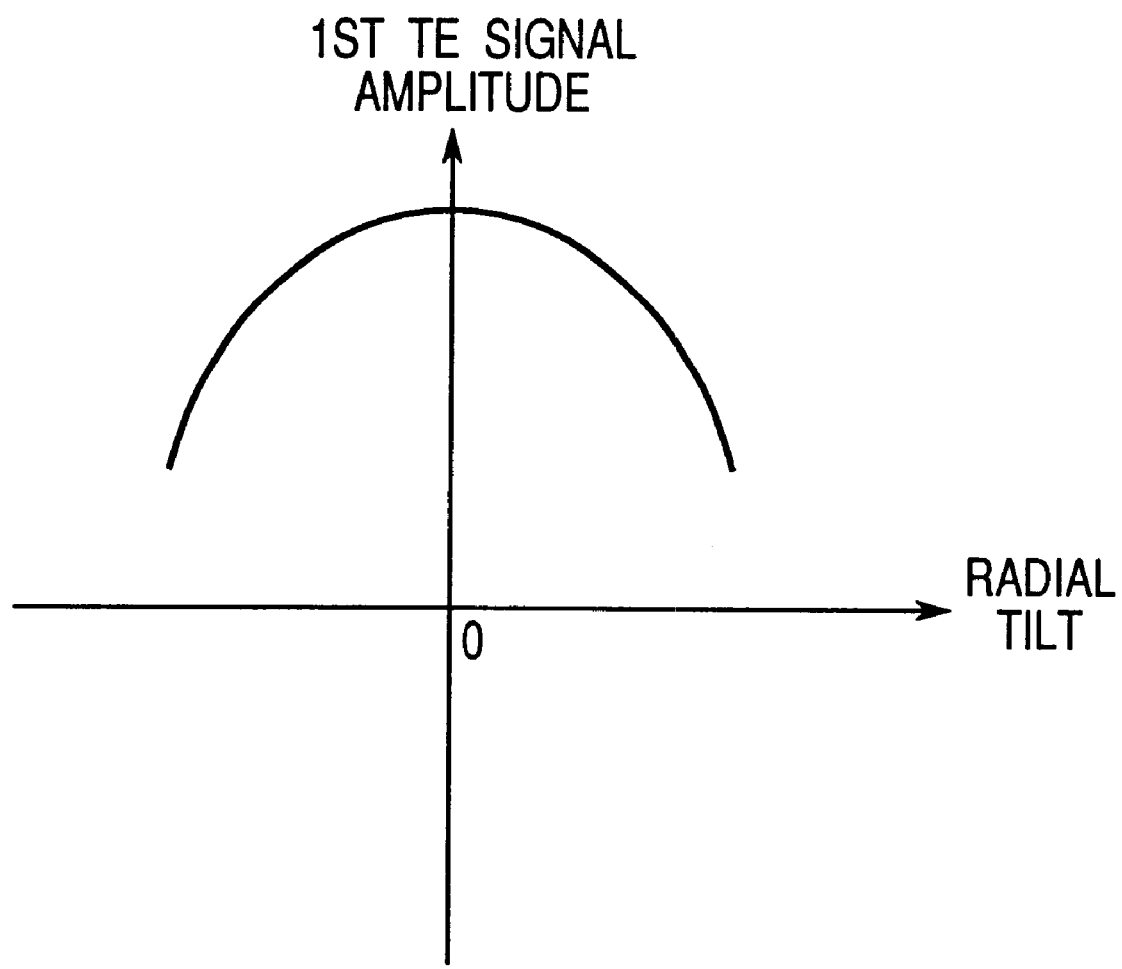
FIG. 32 is a characteristic diagram illustrating the relationship of the first TE signal amplitude and the radial tilt according to the seventh embodiment of the present invention.

FIG. 32 shows the relationship between the amplitude level of the first TE signal and the radial tilt.

The amplitude of the first TE signal becomes a maximum when the radial tilt is zero.

Eighth Embodiment

Figure 33:
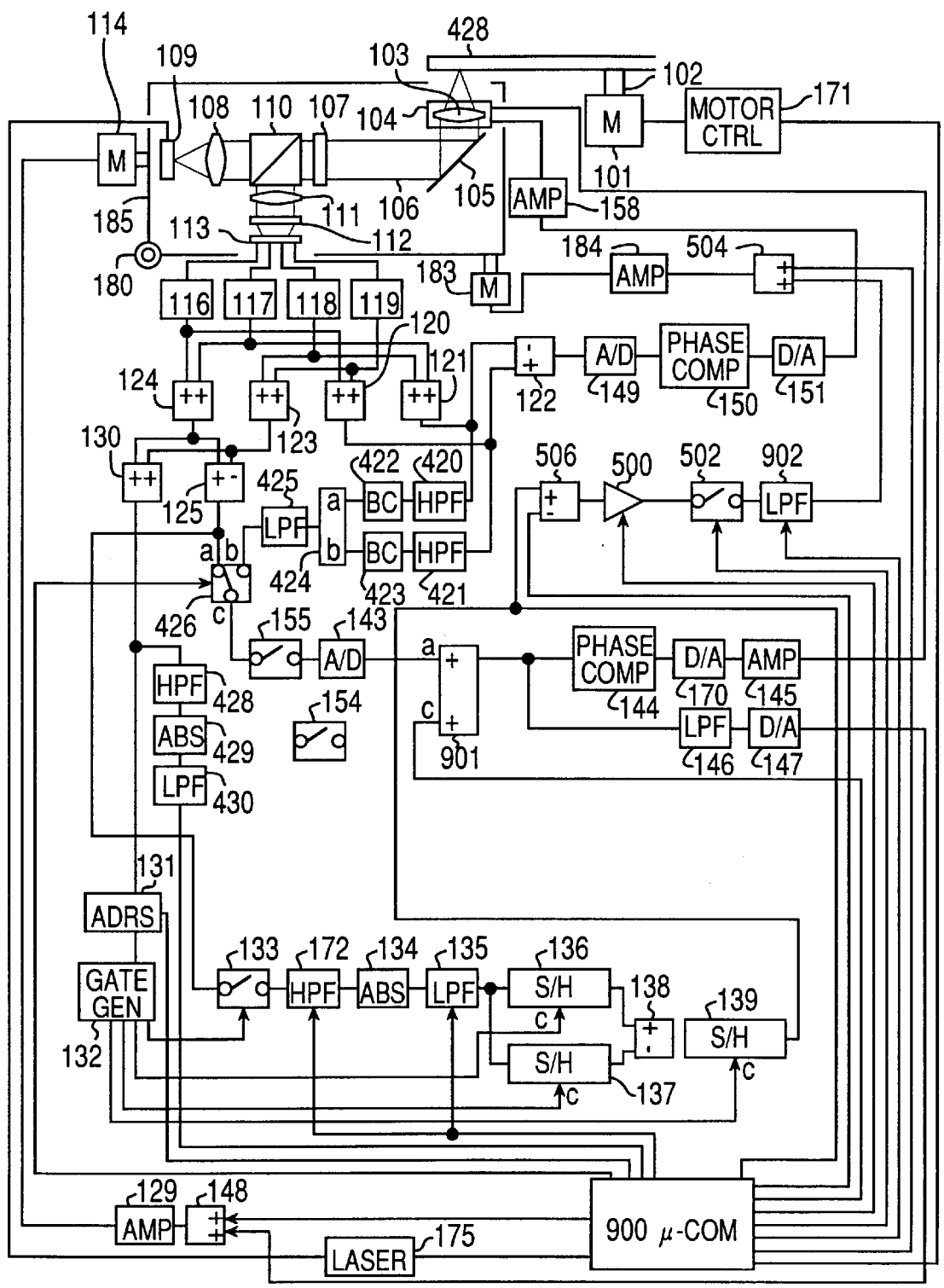
FIG. 33 is a block diagram of an optical disc apparatus according to the eighth embodiment of the present invention.

Hereinbelow an eighth embodiment of the present invention will be described with reference to FIG. 33, which is a block diagram thereof. Blocks which are the same as those of the fourth embodiment described above are given the same reference numerals and further description thereof is omitted.

Figure 24:
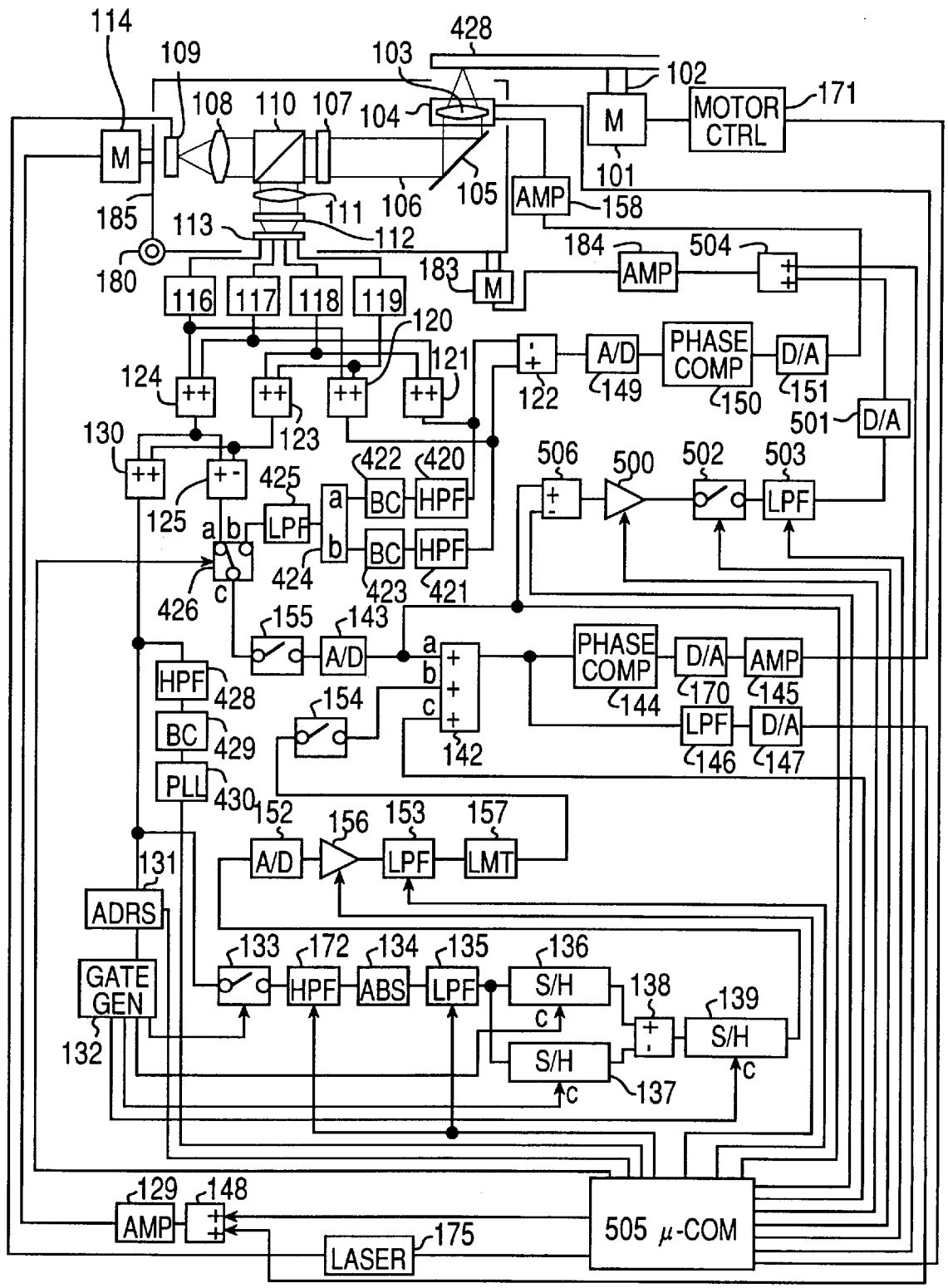
FIG. 24 is a block diagram of an optical disc apparatus according to the fourth embodiment of the present invention.

The points of difference from the fourth embodiment of FIG. 24 are that A/D converter 152, multiplier 156, LPF 153, limiter 157, switch 154, and D/A converter 501 are eliminated; also, microcomputer 505 is replaced by microcomputer 900, adder 142 is replaced by adder 901, and digital LPF 503 is replaced by analogue LPF 902; also, the input of switch 133 is altered from the output of adder 130 to the output of subtractor 125 and the + terminal of subtractor 506 is altered from the output of switch 154 to the output of S/H is circuit 139.

In the eighth embodiment, tracking control is performed based solely on a first TE signal that is detected by the push-pull method. A tracking error due to radial tilt is therefore produced. However, the tracking error can be reduced by performing angle control of the radial tilt. Detection of radial tilt is performed by the first TE signal in the header field. The detection of radial tilt is performed by switch 133, HPF 172, absolute value circuit 134, LPF 135, S/H circuits 136, 137 and 139, and subtractor 138. All the blocks are the same as in the fourth embodiment. That is, the output of S/H circuit 139 is the difference of the amplitude of VFO1 and the amplitude of VFO2 at the output of subtractor 125. The output of S/H circuit 139 is sent to power amplifier 184 through subtractor 506, multiplier 500, switch 502, LPF 902, and adder 504. Since motor 183 is driven in accordance with the output of S/H 139, radial tilt is reduced. That is, tracking error due to radial tilt can be reduced.

Detection of radial tilt will now be described using FIG. 34.

Figure 4B:
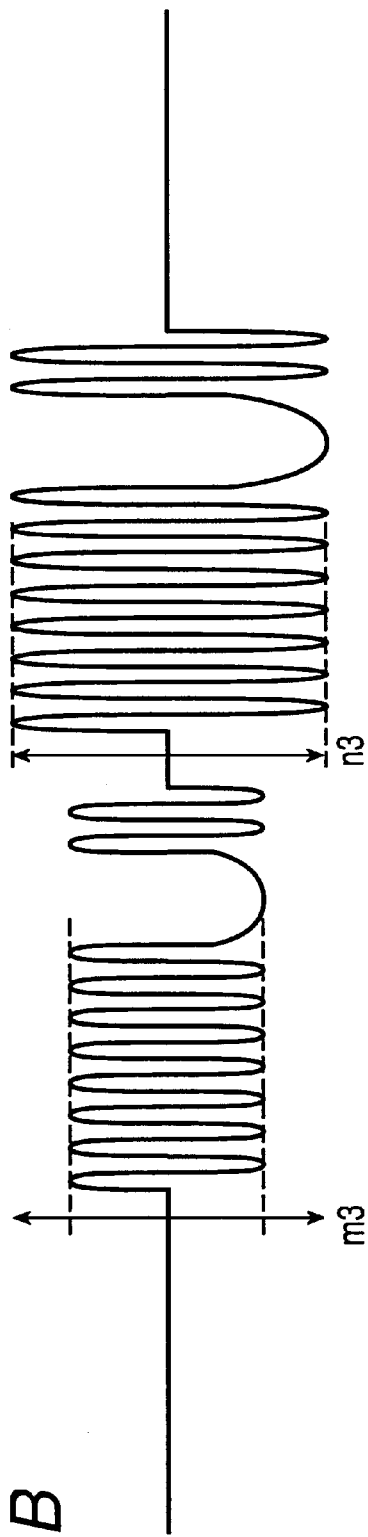
Figure 34:
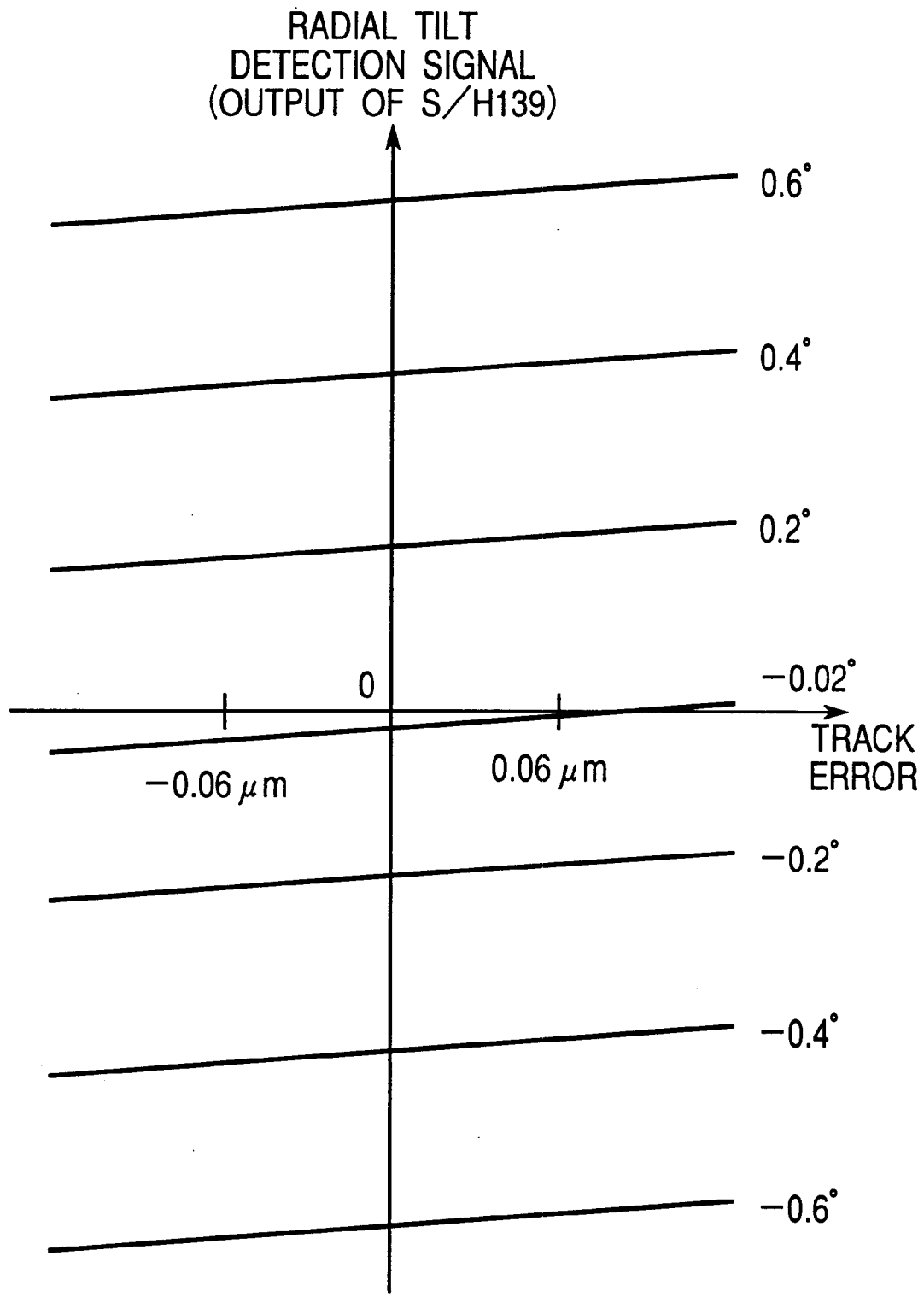
FIG. 34 is characteristic diagram illustrating the relationship of the radial tilt detection signal and radial tilt and track error according to the eighth embodiment of the present invention.
Figure 35:
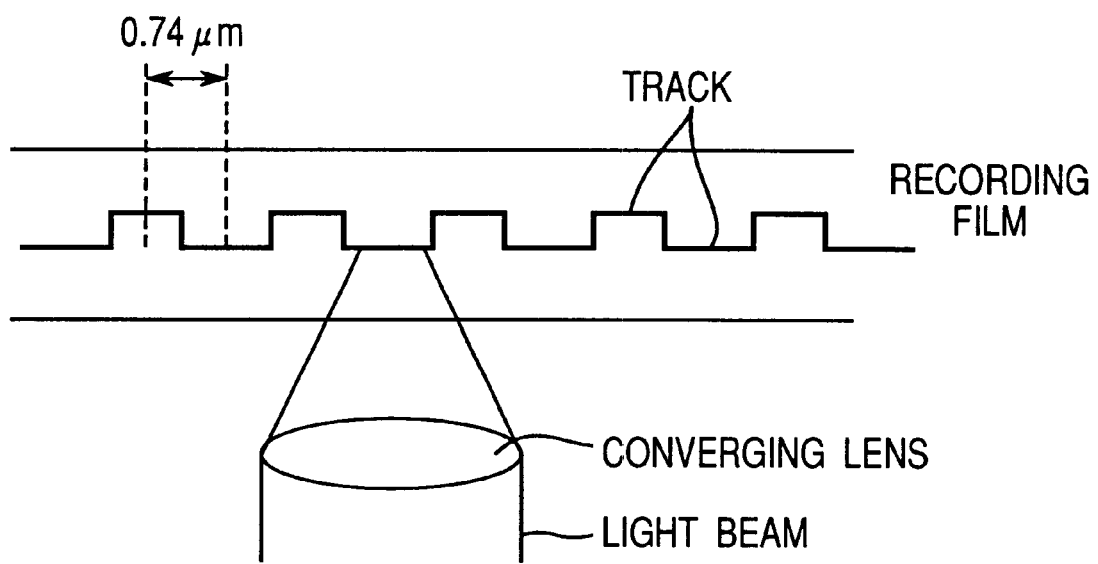
FIG. 35 is a diagram of a disc given in explanation of the prior art optical disc apparatus.
Figure 36:
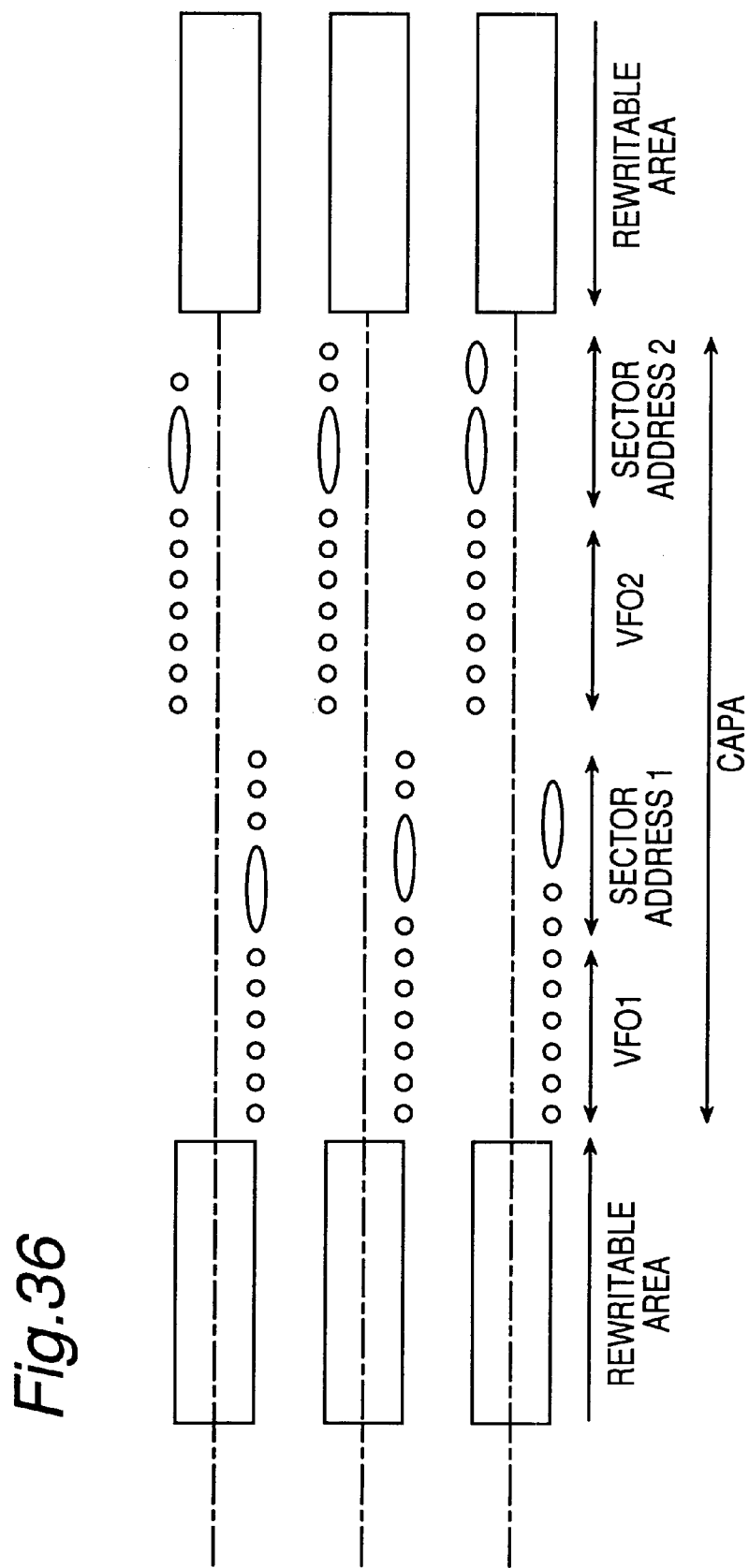
FIG. 36 is a diagram of a header field given in explanation of the prior art optical disc apparatus.
Figure 37:
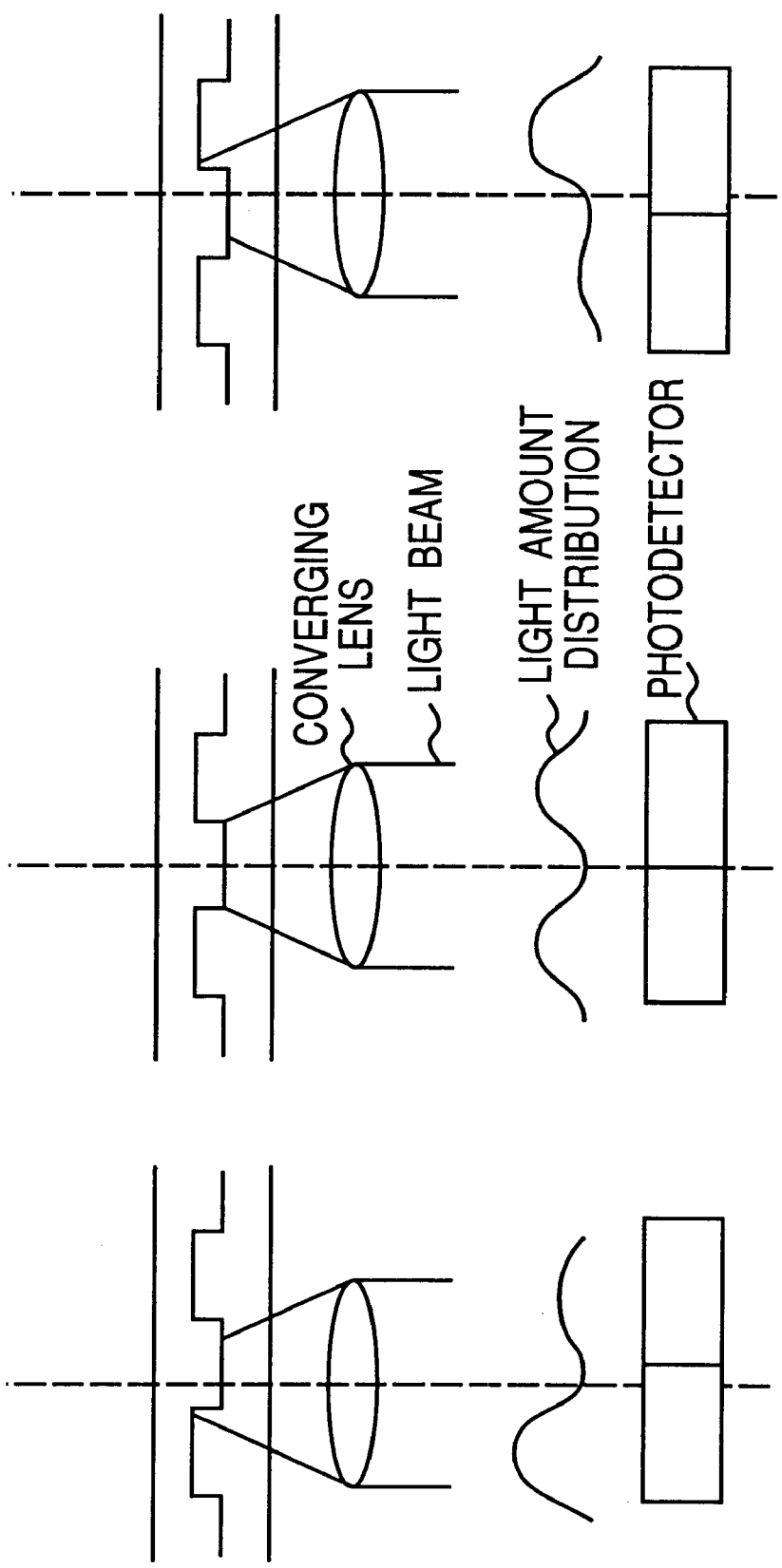
FIG. 37 is a diagram given in explanation of a TE signal detection system using a push-pull method in the description of the prior art optical disc apparatus.
Figure 38:
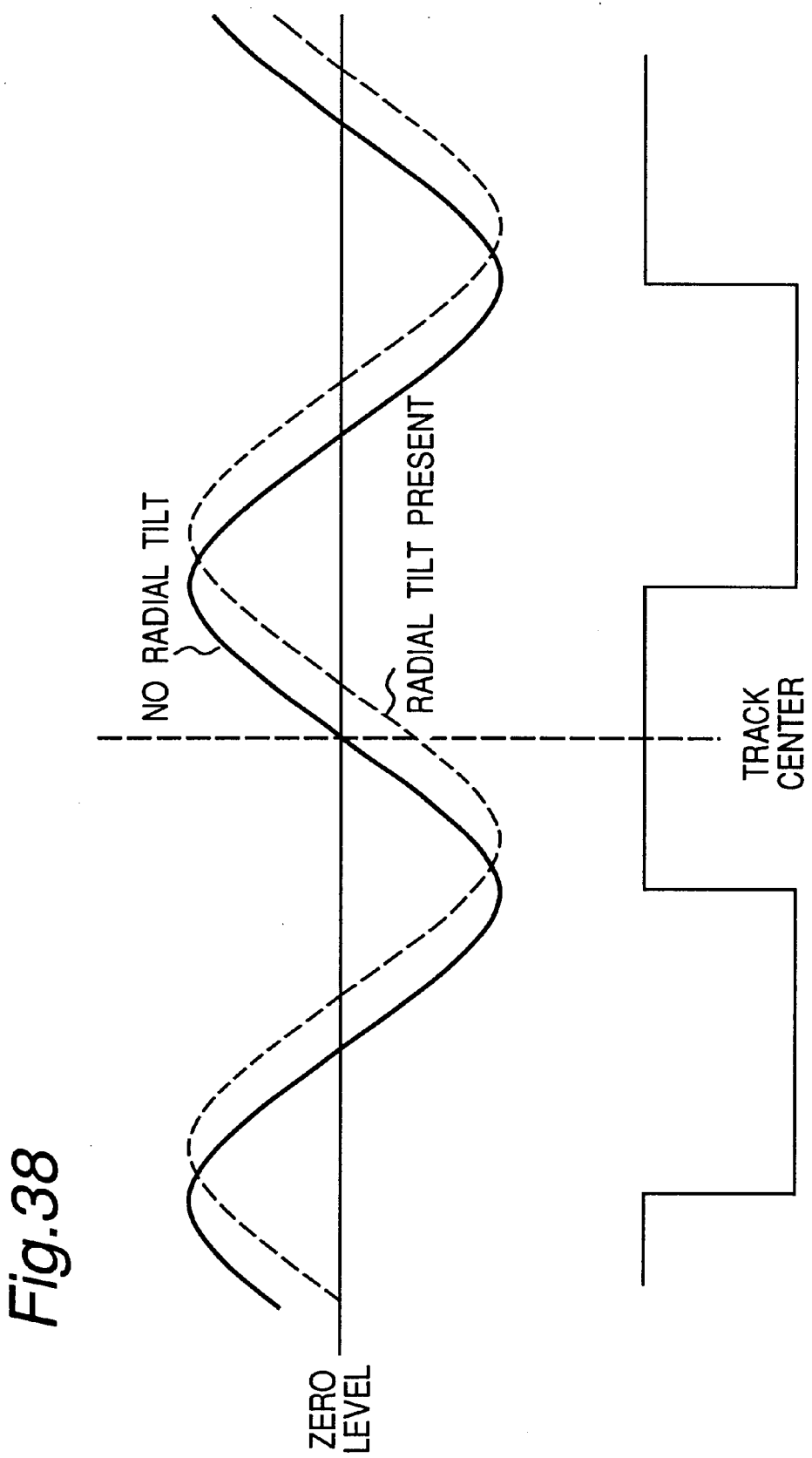
FIG. 38 is a diagram given in explanation of the relationship between the TE signal obtained using a push-pull method and radial tilt in the description of the prior art optical disc apparatus.

FIG. 34 shows the relationship between the difference of the amplitude in VFO1 and the amplitude in VFO2 at the output of subtractor 125 and tracking error and radial tilt. This shows the characteristic under the conditions: NA=0.6, wavelength 650 nm, track pitch 0.6 μm, groove depth= wavelength/6, and land/groove duty of 50%. The horizontal axis shows the tracking error and the vertical axis shows the difference of the amplitude in VFO1 and the amplitude in VFO2 at the output of subtractor 125. The difference in amplitude practically indicates the amount of radial tilt, being independent of the amount of tracking error. That is, the inclinations for each radial tilt are practically parallel to the horizontal axis. The point where the amplitude difference becomes zero for a tracking error of 0.06 μm corresponds to the case of a radial time of about −0.020°. When the radial tilt becomes −0.02°, the tracking error becomes less than −0.01 μm. That is, there is a mutual decrease of radial tilt and tracking error. These are levels that cause no practical problems. The output of subtractor 125 when there is no radial tilt is a waveform that is the same as that of FIG. 2B described above. When radial tilt is present, even if the spot is in the middle of the track, a waveform as shown in FIG. 3B is produced. When the polarity of the radial tilt is inverted, a waveform as shown in FIG. 4B is produced. The (m-n) characteristics in FIG. 2B, FIG. 3B and FIG. 4B in respect of radial tilt are shown in FIG. 34.

Adder 506 will now be described. Adder 506 performs offset correction of the radial tilt detection signal.

Microcomputer 900 moves the light beam spot into the inner circumferential embossed region by driving feed motor 114. By connecting terminal b and terminal c of switch 426, microcomputer 900 sends to A/D converter 143 through switch 155 a TE signal produced by the differential phase method. In a condition with switch 502 open, microcomputer 900 then actuates tracking control by closing switch 155. PLL circuit 430 sends a jitter detection signal to microcomputer 900. Microcomputer 900 drives motor 183 through adder 504 and power amplifier 184 so that the jitter detection signal becomes a minimum. Output to power amplifier 183 is stopped at the time-point where the jitter detection signal has become a minimum.

Microcomputer 900 stops tracking control by opening switch 155. After this, it drives feed motor 114 through power amplifier 129 such that the spot moves into the rewritable region in the vicinity of the embossed region, where the tracks are formed by lands and grooves.

After the movement, tracking control is actuated by closing switch 155. Microcomputer 900 gets the output of S/H circuit 139 and sets this value at one terminal of subtractor 506. The output of subtractor 506 therefore becomes zero. Microcomputer 900 then commences angle control by closing switch 502.

Since in the rewritable region whose tracks are formed by lands and grooves in the vicinity of the embossed region the radial tilt is practically the same, the radial tilt is also zero in the rewritable region whose tracks are formed by lands and grooves in the vicinity of the embossed region. The radial tilt detection offset which is the output of the S/H circuit 139 is therefore corrected.

Since the track is formed in spiral fashion, the spot is gradually displaced towards the outer circumference. If the tilt of the disc etc. changes, the output of the S/H circuit 139 changes in accordance with the radial tilt. Motor 183 is driven in response to the output of the S/H circuit 139 so the radial tilt is always controlled to be zero.

Next, multiplier 500 will be described.

Multiplier 500 adjusts the gain of the radial tilt detection system which is the output of S/H circuit 139. Microcomputer 900 sets a voltage in adder 504 by opening switch 502. Feed cradle 185 is tilted by a prescribed number of degrees of angle by driving motor 183 at a prescribed rotational speed. The output of S/H circuit 139 has a level corresponding to the applied angle. Microcomputer 900 sets the coefficient of multiplier 500 such that the amount of change of output of multiplier 500 at this point is a prescribed value. The gain of the angle control system can be set to a prescribed value by adjusting the coefficient of multiplier 500.

In the eighth embodiment, correction of the target position of tracking control based on the first TE signal in accordance with the difference of the amplitude of the totally reflected light amount signal in VFO1 and the amplitude in VFO2 illustrated in the first embodiment is not performed. However, the correction function can easily be combined with angle control of radial tilt.

Ninth Embodiment

Figure 40:
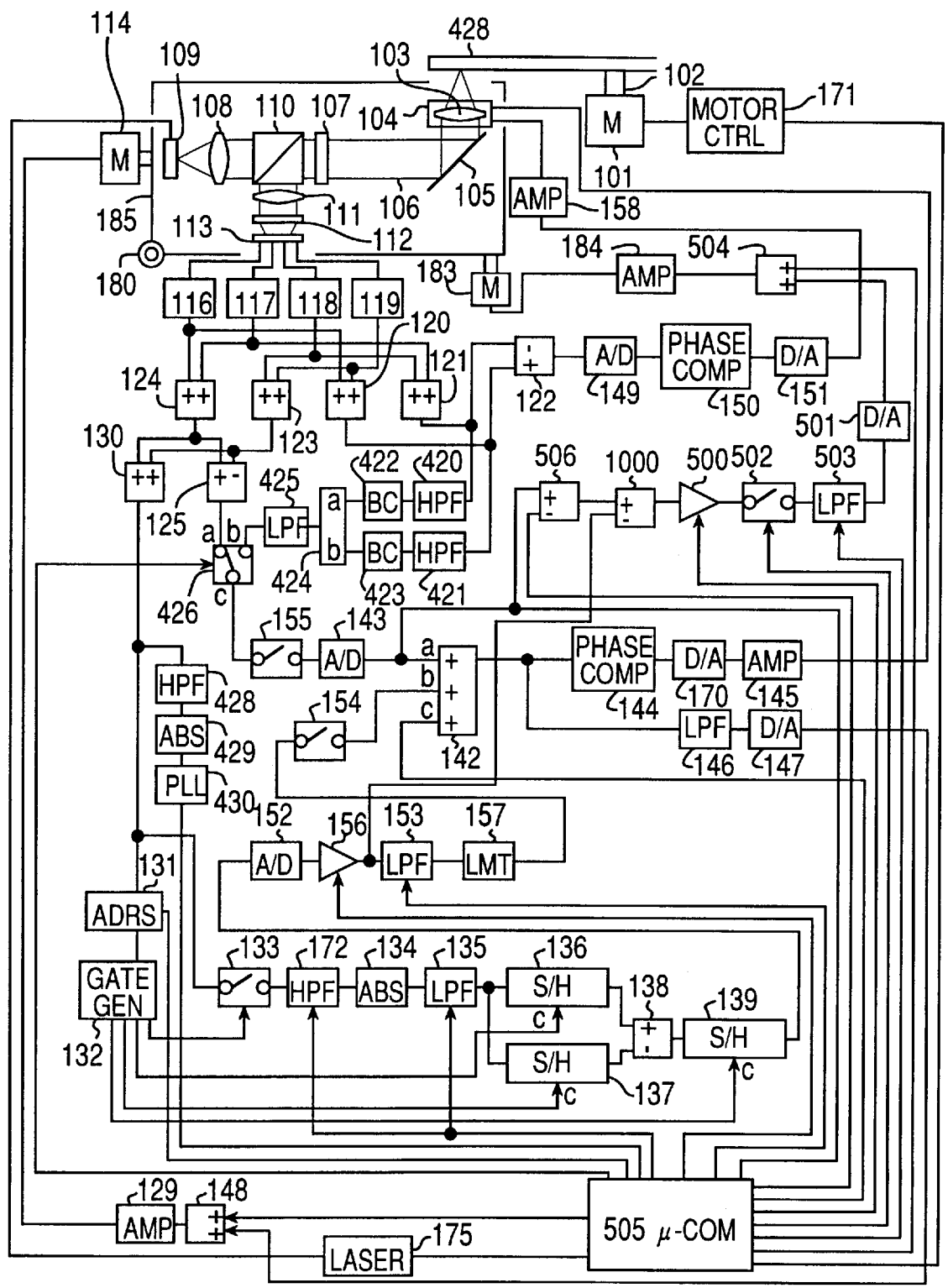
FIG. 40 is a block diagram of an optical disc apparatus according to the ninth embodiment of the present invention.

A ninth embodiment of the present invention will be described below with reference to FIG. 40. Blocks which are the same as in the fourth embodiment described above are given the same reference numerals and further description thereof is omitted.

The point of difference from the fourth embodiment lies in the addition of a subtractor 1000.

In the ninth embodiment, detection of radial tilt for angle adjustment is performed based on the level of the first TE signal, which is the output of subtractor 125, and the normalized second TE signal, which is the output of multiplier 156.

A method of detection of radial tilt for angle adjustment will now be described. As described above, if there is radial tilting, the spot departs from the center of the track even if tracking control is performed such as to make the first TE signal zero. In the construction of this embodiment, tracking error of 0.13 μm is produced with a tilt of 1°.

Likewise, if there is radial tilting, the spot departs from the center of the track even if the target position of tracking control is corrected such as to make the second TE signal zero. Tracking error of 0.045 μm is produced with a tilt of 1°.

Figure 41A:
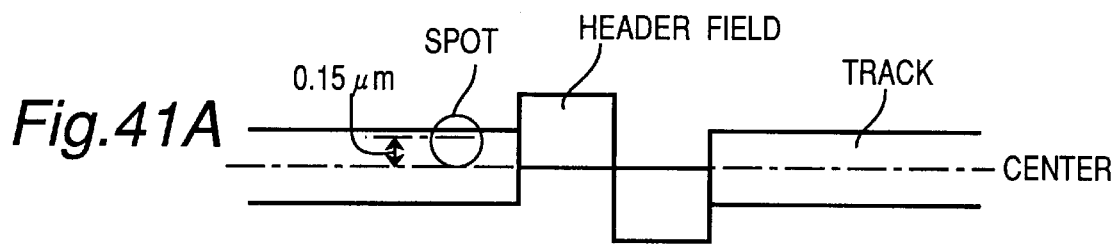
FIGS. 41A, 41B, 41C and 41D are waveforms showing an operation of the apparatus shown in FIG. 40.

That is, the effects of radial tilting on the first TE signal and the second TE signal are different. The case where tracking control such as to make the first TE signal zero with a radial tilt of 1° is performed will now be described using FIGS. 41A to 41D. It will be assumed that a control error of 0.02 μm is produced due to eccentricity of the disc etc. FIG. 41A illustrates the relationship between the spot and the track. Waveform in FIG. 41B shows the first TE signal, waveform in FIG. 41C shows the second TE signal after normalization, and waveform of FIG. 41D shows the waveform obtained by subtracting the second TE signal after normalization from the first TE signal, respectively.

Figure 41B:
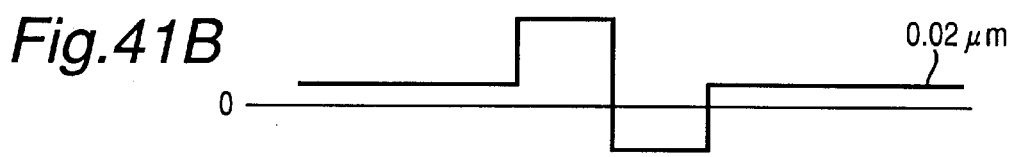
Figure 41C:
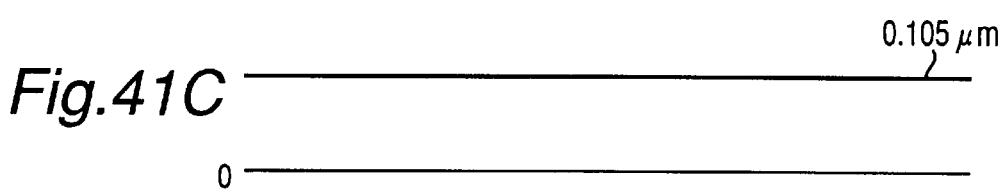
Figure 41D:
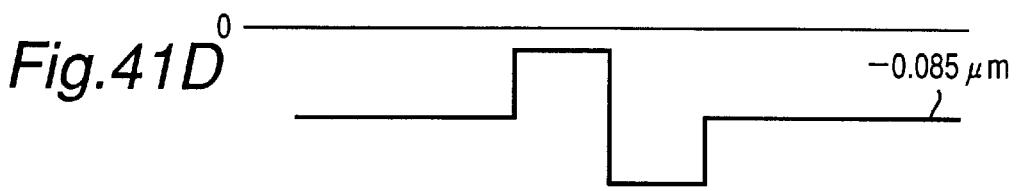

The level of the first TE signal is a level corresponding to a control error of 0.02 μm (see waveform of FIG. 41B). That is, the first TE signal is corrupted in the header field.

Since there is a radial tilt of 1°, combining the errors due to control error and radial tilt, the spot is offset from the center of the track by an amount of 0.15 μm (see FIG. 41A). In the case of the second TE signal, a track error of about 0.045 μm is generated for a tilt of 1°. In this condition therefore, the level of the second TE signal: after normalization is therefore a level corresponding to 0.105 μm, obtained by subtracting 9.045 μm from 0.15 μm (see FIG. 41C).

Accordingly, the second TE signal is subtracted from the first TE signal. The result is that this becomes a level corresponding to −0.085 μm, obtained by subtracting 0.105 μm from 0.02 μm (see FIG. 41D). It should be noted that, although the first TE signal in the header field is corrupted, the effect of this can be neglected since the duration of the header field is shorter than the duration of the rewritable region.

Although in the above description the case of 1° was assumed, in the case of 0.5°, the result of the subtraction would be a result corresponding to −0.0425 μm. Also, in the case of −1°, the result of the subtraction would be a level corresponding to 0.085 μm.

That is, the difference of the levels of the first TE signal and the second TE signal is proportional to the radial tilt.

Figure 42:
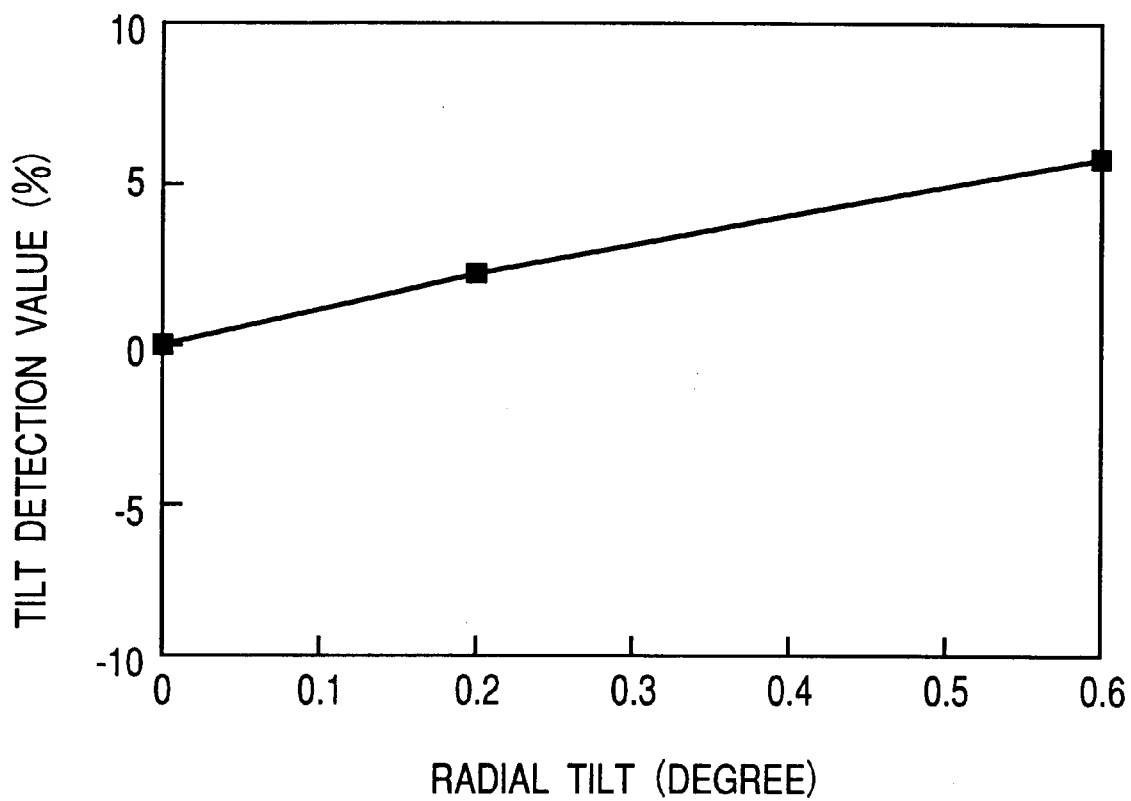
FIG. 42 is a graph showing a tilt detection characteristic.

FIG. 42 illustrates the tilt detection characteristic when radial tilt is detected by subtracting the level of the second TE signal from that of the first TE signal. The axis of abscissa of FIG. 42 is the radial tilt (shown in units of degrees), while the axis of ordinate indicates the tilt detection value (units %) which is the result of the subtraction. The tilt detection value (units %) is the amplitude of the signal in VFO1 and VFO2 described above assuming the amount of the totally reflected light in the mirror-surface portion of the disc to be 100%, and is a normalized value obtained by subtracting the normalized second TE signal from the first TE signal. The tilt detection value is 0% when the radial tilt is 0° and is 5.77% when the radial tilt is 0.6°. The polarity of the tilt detection value is inverted.

As is clear from FIG. 42, the result of subtracting the level of the normalized-second TE signal from the first TE signal is practically proportional to the radial tilt. That is the radial tilt can be detected by subtracting the level of the normalized second TE signal from the first TE signal.

Subtractor 1000 subtracts the level of the second TE signal from the level of the first TE signal. Consequently, its output value is the detection signal of radial tilt. Angle control can be achieved by driving motor 183 in accordance with the output of subtractor 1000.

As will be clear from the above description, with the present invention, tracking error due to inclination can be corrected by correcting the TE signal produced by the push-pull method by a second TE signal that detects positional error of the light beam and the track by using the reflected light from the disc when the light beam passes over a first pit sequence formed in a position offset in one direction orthogonal to the track and a second pit sequence formed in a position offset in the other direction orthogonal to the track, the spot being thereby controlled to the center of the track.

Also, the inclination is made perpendicular since the inclination of the optic axis of the light beam and the information surface of the disc is controlled using a TE signal obtained by the push-pull method when the TE signal obtained by the push-pull method is corrected using a second TE signal that detects positional error of the light beam and track by using the reflected light amount when the light beam passes over a first pit sequence formed in a position offset in one direction orthogonal to the track and a second pit sequence formed in a position offset in the other direction orthogonal to the track.

What is claimed is:

1. Optical disc apparatus comprising:
   reproduction signal detector that detects information recorded on a disc by directing a light beam onto a disc on which there are arranged a first pit sequence formed in a position offset in one direction orthogonal to a track and a second pit sequence formed in a position offset in the other direction orthogonal to the track;
   first tracking error detector that detects positional offset of the track and the light beam by a push-pull method;
   second tracking error detector that detects positional offset of the track and the light beam from the reproduction signals of the first pit sequence and of the second pit sequence output by said reproduction signal detector;
   moving arrangement which moves the light beam transversely across the track;
   tracking control that controls said moving arrangement in accordance with the output of said first tracking error detector such that the light beam is positioned on the track; and
   correction arrangement which changes the target position of said tracking control in accordance with the output of said second tracking error detector.

2. Optical disc apparatus according to claim 1 wherein said correction arrangement sets an initial value of the amount of correction in accordance with the output of the second tracking error detector immediately prior to actuation of the correction arrangement.

3. Optical disc apparatus according to claim 1 wherein the correction arrangement detects previously an amount of change of the output of the second tracking error detector when the target position of the tracking control is changed, and corrects the target position in accordance with the amount of change that is thus detected.

4. Optical disc apparatus according to claim 1 wherein the correction arrangement is so arranged that the range of variability of the target position is restricted to a predetermined range.

5. Optical disc apparatus according to claim 1 wherein the correction arrangement is disabled for a period until the tracking control is settled.

6. Optical disc apparatus according to claim 1 wherein the correction arrangement operates only in the case of information recording.

7. Optical disc apparatus according to claim 1 wherein the second tracking error detector detects a positional offset between the light beam and the track during a period of tracking the first and second pit sequences.

8. Optical disc apparatus according to claim 1 wherein the second tracking error detector detects a positional offset between the light beam and the track in accordance with a difference in the amplitude of the output of the reproduction signal detector when the light beam passes the first pit sequence and the second pit sequence.

9. Optical disc apparatus according to claim 8 wherein the second tracking error detector measures an amplitude using a signal obtained by removing high-frequency components after converting the output from the reproduction signal detector into an absolute value with reference to the center of the amplitude.

10. Optical disc apparatus according to claim 9 wherein the band of the high-frequency components that are removed is changed in accordance with linear velocity.

11. Optical disc apparatus comprising:
    reproduction signal detector that detects information recorded on a disc by directing a light beam onto a disc on which there are arranged a first pit sequence formed in a position offset in one direction orthogonal to a track and a second pit sequence formed in a position offset in the other direction orthogonal to the track;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

moving arrangement which moves the light beam transversely across the track;

angle changing arrangement that changes the angle of incidence of the light beam that is directed onto the information surface;

angle detector that detects the angle of incidence of the light beam that is directed onto the information surface angle control that controls said angle changing arrangement in accordance with the output of said angle detector;

tracking control that controls said moving arrangement in accordance with the output of said first tracking error detector so that the light beam is positioned on the track; and correction arrangement which changes the target position of said tracking control in accordance with the output of said second tracking error detector.

12. Optical disc apparatus comprising:

reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

third tracking error detector that detects positional offset of the track and the light beam by a differential phase from the reproduction signal of the pit sequence of the second region that is output by said reproduction signal detector;

jitter detector that detects jitter of the output of said reproduction signal detector;

moving arrangement which moves the light beam transversely across the track;

angle changing arrangement that changes the angle of incidence of the light beam that is directed onto the information surface;

angle control that controls said angle changing arrangement such that the output of said jitter detector is a minimum;

first tracking control that controls said moving arrangement in accordance with the output of said first tracking error detector such that the light beam is positioned on the track;

correction arrangement which changes the target position of said first tracking control in accordance with the output of said second tracking error detector; and second tracking control that controls said moving arrangement in accordance with the output of said third tracking error detector such that the light beam is positioned on the track;

wherein in the second region said angle changing arrangement is put in holding condition after actuating said angle control by putting said second tracking control in actuated condition, and in the first region said first tracking control and said correction arrangement are actuated.

13. Optical disc apparatus comprising:

reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

third tracking error detector that detects positional offset of the track and the light beam by a differential phase from the reproduction signal of the pit sequence of the second region that is output by said reproduction signal detector;

PLL circuit that generates a reference clock synchronized with information recorded on the disc using the output of said reproduction signal detector;

jitter detector that detects jitter of said reference clock and the output of said reproduction signal detector;

moving arrangement which moves the light beam transversely across the track;

angle changing arrangement that changes the angle of incidence of the light beam that is directed onto the information surface;

angle control that control said angle changing arrangement such that the output of said jitter detector is a minimum;

first tracking control that controls said moving arrangement in accordance with the output of said first tracking error detector such that the spot is positioned on the track;

correction arrangement which changes the target position of said first tracking control in accordance with the output of said second tracking error detector; and second tracking control that controls said moving arrangement in accordance with the output of said third tracking error detector such that the light beam is positioned on the track;

wherein in the second region said angle changing arrangement is put in holding condition after actuating said angle control by putting said second tracking control in actuated condition, and in the first region said first tracking control and said correction arrangement are actuated.

14. Optical disc apparatus according to claim 13 wherein in the first region said first tracking control and said correction arrangement are actuated, after setting the angle of said angle changing arrangement at a predetermined radial position in accordance with the angle of the angle changing arrangement when said angle control is actuated by putting said second tracking control in actuated condition in the second region of the outer circumference and inner circumference.

15. Optical disc apparatus comprising:

reproduction signal detector that detects information recorded on a disc by directing a light beam onto a disc in which there are arranged a first pit sequence formed in a position offset in one direction orthogonal to a track and a second pit sequence formed in a position offset in the other direction orthogonal to the track;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

moving arrangement which moves the spot transversely across the track;

angle changing arrangement that changes the angle of incidence of the light beam that is directed onto the information surface;

amplitude detector that detects an amplitude of the output of said first tracking error detector;

angle control that controls said angle changing arrangement such that the output of said amplitude detector is a maximum;

tracking control that controls said moving arrangement in accordance with the output of said first tracking error detector such that the light beam is positioned on the track; and correction arrangement which changes the target position of said tracking control in accordance with the output of said second tracking error detector;

wherein said angle changing arrangement is put in holding condition after actuating said angle control by putting said tracking control in disabled condition, and said tracking control and said correction arrangement are actuated.

16. Optical disc apparatus comprising:

reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;

first tracking error detector that detects positional offset of the track and the light beam by a push-pull method;

second tracking error detector that detects positional offset of the track and the light beam from the reproduction signals of the first pit sequence and of The second pit sequence output by said reproduction signal detector;

third tracking error detector that detects positional offset of the track and the light beam by a differential phase from the reproduction signal of the pit sequence of the second region that is output by said reproduction signal detector;

information amplitude detector that detects the amplitude of the output of said reproduction signal detector;

moving arrangement which moves the light beam transversely across the track;

angle changing arrangement that changes the angle of incidence of the light beam that is directed onto the information surface;

angle control that controls said angle changing arrangement such that the output of said information amplitude detector is a maximum;

first tracking control that controls said moving arrangement in accordance with the output of said first tracking error detector such that the light beam is positioned on the track;

correction arrangement that changes the target position of said first tracking control in accordance with the output of said second tracking error detector; and second tracking control that controls said moving arrangement in accordance with the output of said third tracking error detector such that the spot is positioned on the track;

wherein in the first region said angle changing arrangement is put in holding condition after actuating said angle control by putting said second tracking control in actuated condition, and in the first region said first tracking control and correction arrangement are actuated.

17. Optical disc apparatus comprising:

reproduction signal detector that detects information recorded on a disc by directing a light beam onto a disc on which there are arranged a first pit sequence formed in a position offset in one direction orthogonal to a track and a second pit sequence formed in a position offset in the other direction orthogonal to the track;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

moving arrangement which moves the light beam transversely across the track;

angle changing arrangement that changes the angle of incidence whereby the light beam is directed onto the information surface;

tracking control that controls said moving arrangement in accordance with the output of said first tracking error detector such that the light beam is positioned on the track;

correction arrangement which changes the target position of said tracking control in accordance with the output of said second tracking error detector; and angle control that controls said angle changing arrangement in accordance with the output said first tracking error detector when said correction arrangement is actuated.

18. Optical disc apparatus according to claim 17, wherein said angle control is arranged such that the gain of the control system is adjusted previously in accordance with the amount of change of output of the first tracking error detector when the angle changing arrangement is driven.

19. Optical disc apparatus according to claim 17, wherein said angle changing arrangement is put into a holding condition in the immediately previous condition when said correction arrangement is put into disabled condition.

20. Optical disc apparatus according to claim 17, wherein said angle changing arrangement is put into a holding condition in the immediately previous condition when said tracking control is put into disabled condition.

21. Optical disc apparatus according to claim 17, wherein said angle control is actuated after driving the angle changing arrangement in accordance with the output of the first tracking error detector immediately prior to actuation of the angle control.

22. Optical disc apparatus comprising:
reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;
first tracking error detector that detects positional offset of the track and the light beam by a push-pull method;
second tracking error detector that detects positional offset of the track and the light beam from the reproduction signals of the first pit sequence and of the second pit sequence output by said reproduction signal detector;
third tracking error detector that detects positional offset of the track and the light beam by a differential phase from the reproduction signal of the pit sequence of the second region that is output by said reproduction signal detector;
jitter detector that detects jitter of output of said reproduction signal detector;
moving arrangement which moves the light beam transversely across the track;
angle changing arrangement that changes the angle of incidence of the light beam that is directed onto the information surface;
angle control that controls said angle changing arrangement such that the output of said jitter detector is a minimum;
first tracking control that controls said moving arrangement in accordance with the output of said first tracking error detector such that the light beam is positioned on the track;
correction arrangement which changes the target position of said tracking control in accordance with the output of said second tracking error detector; and
second tracking control that controls said moving arrangement in accordance with the output of said third tracking error detector such that the light beam is positioned on the track;
wherein in the second region said angle changing arrangement is put in holding condition after actuating said angle changing arrangement by putting said second tracking control in actuated condition, and in the adjacent first region said first tracking control and said correction arrangement are actuated to measure the output value of said first tracking error detector, and said angle control is operated in accordance with the difference of said measured output value and the output of said first tracking error detector.

23. Optical disc apparatus according to claim 22, wherein the angle changing arrangement is put into holding condition after actuation of the angle control in a condition with the second tracking control actuated in the second region at the outer circumference and inner circumference, and the first tracking control and correction arrangement are actuated in the respective adjacent first regions to measure the output value of the first tracking error detector, and a reference value is calculated at a predetermined radial position based on said two measured values, said angle control being operated in accordance with the difference of said reference value and the output of said first tracking error detector.

24. Optical disc apparatus comprising:
reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;
first tracking error detector that detects positional offset of the track and the light beam by a push-pull method;
second tracking error detector that detects positional offset of the track and the light beam from the reproduction signals of the first pit sequence and of the second pit sequence output by said reproduction signal detector;
third tracking error detector that detects positional offset of the track and the light beam by a differential phase from the reproduction signal of the pit sequence of the second region that is output by said reproduction signal detector;
PLL circuit that generates a reference clock synchronized with information recorded on the disc using the output of said reproduction signal detector;
jitter detector that detects jitter of said reference clock and the output of said reproduction signal detector;
moving arrangement which moves the light beam transversely across the track;
angle changing arrangement that changes the angle of incidence of the light beam that is directed onto the information surface;
angle control that controls said angle changing arrangement such that the output of said jitter detector is a minimum;
first tracking control that controls said moving arrangement in accordance with the output of said first tracking error detector such that the light beam is positioned on the track;
correction arrangement which changes the target position of said first tracking control in accordance with the output of said second tracking error detector; and
second tracking control that controls said moving arrangement in accordance with the output of said third tracking error detector such that the light beam is positioned on the track;
wherein in the second region said angle changing arrangement is put in holding condition after actuating said angle control by putting said second tracking control in actuated condition, and in the adjacent first region said first tracking control and correction arrangement are actuated to measure the output value of said first tracking error detector, and said angle control is operated in accordance with the difference of said measured output value and the output of said first tracking error detector.

25. Optical disc apparatus comprising:
reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

third tracking error detector that detects positional offset of the track and the light beam by a differential phase from the reproduction signal of the pit sequence of the second region that is output by said reproduction signal detector;

information amplitude detector that detects the amplitude of the output of said reproduction signal detector;

moving arrangement which moves the light beam transversely across the track;

angle changing arrangement that change the angle of incidence of the light beam that is directed onto the information surface;

angle control that controls said angle changing arrangement such that the output of said information amplitude detector is a maximum;

first tracking control that controls said moving arrangement in accordance with the output of said first tracking error detector such that the light beam is positioned on the track;

correction arrangement which changes the target position of said first tracking control in accordance with the output of said second tracking error detector; and second tracking control that controls said moving arrangement in accordance with the output of said third tracking error detector such that the light beam is positioned on the track;

wherein in the second region said angle changing arrangement is put in holding condition after actuating said angle control by putting said second tracking control in actuated condition, and in the adjacent first region said first tracking control and correction arrangement are actuated to measure the output value of said first tracking error detector, and said angle control is operated in accordance with the difference of said measured value and the output of said first tracking error detector.

26. Optical disc apparatus comprising:

reproduction signal detector that detects information recorded on a disc by directing a light beam onto a disc in which there are arranged a first pit sequence formed in a position offset in one direction orthogonal to a track and a second pit sequence formed in a position offset in the other direction orthogonal to the track;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

amplitude detector that detects the amplitude of the output of said first tracking error detector;

moving arrangement which moves the light beam transversely across the track;

angle changing arrangement that changes the angle of incidence whereby the light beam is incident on the information surface;

angle control that controls said angle changing arrangement such that the output of said amplitude detector is a maximum;

tracking control that controls said moving arrangement in accordance with the output of said first tracking error detector such that the light beam is positioned on the track; and correction arrangement which changes the target position of said tracking control in accordance with the output of said second tracking error detector;

wherein said angle changing arrangement is put in holding condition after actuating said angle control by putting said tracking control in disabled condition, and said tracking control and correction arrangement are actuated to measure output value of said first tracking error detector, said angle control being operated in accordance with the difference of said measured output value and the output of said first tracking error detector.

27. Optical disc apparatus comprising:

reproduction signal detector that detects information recorded on a disc by directing a light beam onto a disc having a first region in which there are arranged a first pit sequence formed in a position offset in one direction orthogonal to a track and a second pit sequence formed in a position offset in the other direction orthogonal to the track, and a second region in which information is recorded by a pit sequence;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

third tracking error detector that detects positional offset of the track and the light beam by a differential phase from the reproduction signal of the pit sequence of the second region that is output by said reproduction signal detector;

jitter detector that detects jitter of the output of said reproduction signal detector;

moving arrangement which moves the light beam transversely across the track;

angle changing arrangement that changes the angle of incidence of the light beam that is directed onto the information surface;

angle control that controls said angle changing arrangement such that the output of said jitter detector is a minimum;

first tracking control that controls said moving arrangement in accordance with the output of said first tracking error detector such that the light beam is positioned on the track;

correction arrangement that changes the target position of said tracking control in accordance with the output of said second tracking error detector; and second tracking control that controls said moving arrangement in accordance with the output of said third tracking error detector such that the light beam is positioned on the track;

wherein in said second region said angle changing arrangement is put in holding condition after actuating said angle control by putting said second tracking control in actuated condition, and in the adjacent first region said first tracking control and said correction arrangement are actuated to measure the output value of said first tracking error detector, and said angle control and said first tracking control are operated in accordance with the difference of said measured value and the output of said first tracking error detector.

28. Optical disc apparatus comprising:

reproduction signal detector that detects information recorded on a disc by directing a light beam onto a disc in which there are arranged a first pit sequence formed in a position offset in one direction orthogonal to a track and a second pit sequence formed in a position offset in the other direction orthogonal to the track;

first tracking error detector that detects positional offset of the track and the light beam by a push-pull method;

second tracking error detector that detects positional offset of the track and the light beam from the reproduction signals of the first pit sequence and of the second pit sequence output by said reproduction signal detector;

moving arrangement which moves the light beam transversely across the track;

angle changing arrangement that changes the angle of incidence of the light beam that is directed onto the information surface;

tracking control that controls said moving arrangement in accordance with the output of said first tracking error detector such that the light beam is positioned on the track; and angle control that controls said angle changing arrangement in accordance with the difference of the output of said first tracking error detector and the output of said second tracking error detector.

29. Optical disc apparatus comprising:

tracking error detector that detects, by a push-pull method, positional offset of the track and the light beam directed onto a disc in which there are arranged a first pit sequence formed in a position offset in one direction orthogonal to a track and a second pit sequence formed in a position offset in the other direction orthogonal to the track;

angle detector that detects angle of incidence of the light beam that is directed onto the information surface of the disc in accordance with the signals produced from said tracking error detector relatively to said first pit sequence and said second pit sequence;

moving arrangement which moves the light beam transversely across the track;

angle changing arrangement that changes the angle of incidence of the light beam that is directed onto the information surface;

tracking control that controls said moving arrangement in accordance with the output of said tracking error detector such that the light beam is positioned on the track; and angle control that controls said angle changing arrangement in accordance with the output obtained from said angle detector.

* * * * *